United States Patent [19]

Tyouno et al.

[11] Patent Number: 5,191,490
[45] Date of Patent: Mar. 2, 1993

[54] AUTO REVERSE TYPE TAPE PLAYER CAPABLE OF SELECTIVELY SWITCHING BETWEEN A ONE-CYCLE MODE AND AN ENDLESS MODE

[75] Inventors: Susumu Tyouno; Norihiro Kurokawa; Masafumi Kurata; Hideo Yoshida, all of Higashihiroshima, Japan

[73] Assignee: Sharp Kabushiki Kaisha, Osaka, Japan

[21] Appl. No.: 599,215

[22] Filed: Oct. 17, 1990

[30] Foreign Application Priority Data

Oct. 18, 1989 [JP] Japan ................. 1-272630
Jan. 16, 1990 [JP] Japan ................. 2-7618
Jan. 16, 1990 [JP] Japan ................. 2-7619

[51] Int. Cl.$^5$ ............................... G11B 15/18
[52] U.S. Cl. ........................ 360/71; 360/137; 360/74.1
[58] Field of Search ............... 360/71, 74.1, 137, 74.2, 360/74.3, 96.2, 96.3, 96.4, 105; 200/341

[56] References Cited

U.S. PATENT DOCUMENTS

| 4,430,532 | 2/1984 | Matsumoto | 200/341 |
| 4,503,476 | 3/1985 | Kommoss et al. | 360/90 |
| 4,638,389 | 1/1987 | Barth | 360/74.1 |
| 4,758,910 | 7/1988 | Kaneko et al. | 360/137 |
| 4,788,713 | 11/1988 | Hashimoto | 360/137 |
| 4,897,742 | 1/1990 | Hashimoto | 360/74.1 |
| 4,939,601 | 7/1990 | Endo et al. | 360/137 |

Primary Examiner—John H. Wolff
Assistant Examiner—Craig A. Renner

[57] ABSTRACT

An auto reverse type tape player is capable of selectively switching between a one-cycle mode and an endless mode. When a play button is operated once, the one-cycle mode is set and when the play button is reoperated within a prescribed period thereafter, the endless mode is set.

3 Claims, 21 Drawing Sheets

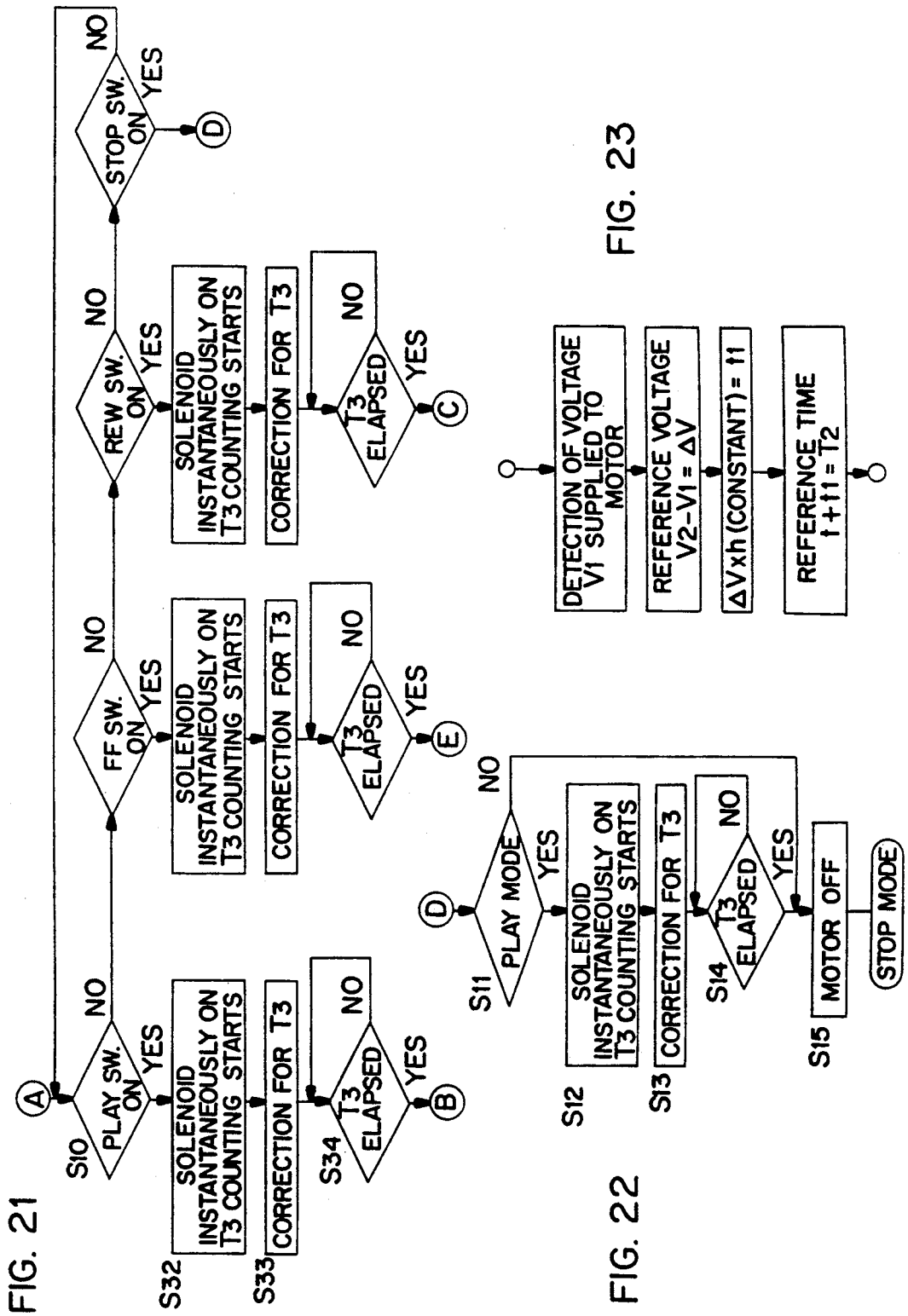

AUTO REVERSE TYPE TAPE PLAYER CAPABLE OF SELECTIVELY SWITCHING BETWEEN A ONE-CYCLE MODE AND AN ENDLESS MODE

BACKGROUND OF THE INVENTION

1. Field of the Invention

The present invention relates to auto reverse type tape players and more particularly to an auto reverse type tape player capable of performing endless play using a battery as a power supply.

2. Description of the Background Art

An auto reverse type tape player is capable of selectively switching between a one-cycle mode where a tape driving motor is stopped after one cycle of forward play and reverse play, and an endless mode where the above-mentioned cycle is repeated without stopping the motor. A conventional auto reverse type tape player has a switch for setting the endless mode and when the user desires to repeat forward play and reverse play, he or she operates the above-mentioned switch to set the endless mode.

In the auto reverse type tape player of the above-mentioned structure, it is necessary to provide a switch dedicated to setting of the endless mode in an operation portion. Consequently, the structure of the operation portion is complicated. In addition, operability is not good because after a play button is operated, it is necessary to operate the endless mode setting switch provided separately.

An auto reverse type tape player as described below is also known. This auto reverse type tape player includes: cam means rotating from a start position to an operation mode setting position via a mode selection position using a motor as a drive source; lever means engaged with the cam means and moving according to the rotation of the cam means, thereby switching among operation modes of a tape; drive means for moving the lever means to change a positional relation between the cam means and the lever means; selection position detecting means for detecting the cam means in the mode selection position by determining that elapsed time after start of movement of the cam means attains a preset reference time; and control means responsive to a detection signal from the selection position detecting means for controlling movement of the drive means based on an inputted operation mode signal.

In the auto reverse type tape player of such a structure as described above, the time required for the cam means to rotate from the start position to the mode selection position by the motor under the reference voltage is calculated and this time is set as the reference time. In consequence, problems as described below are involved. In a tape player using a battery as a power supply, the voltage supplied to the motor changes according to change in the battery capacity Consequently, the rotation speed of the motor also changes. The conventional tape player detects that the cam means is in the mode selection position, by determining that the elapsed time after start of movement of the cam means attains the preset reference time. However, if the rotation speed of the motor changes, the time required for the cam means to attain the mode selection position also changes. Thus, the conventional tape player does not have a good precision for detection of the mode selection position and involves irregularity in timing for changing the positional relation between the cam means and the lever means.

Some improvement might be made with respect to the above-described disadvantage if a range of timing for switching of operation modes is enlarged. However, there is a limitation in increasing such range of timing and this method is not so effective. In addition, if the range of application of the voltage supplied to the motor is set narrow, there is another disadvantage that the time of use of the battery is shortened.

An auto reverse type tape player having first and second oscillation mechanisms is also known. In this auto reverse type tape player, the first oscillation mechanism includes a play gear engaging with motor drive gear means, and the second oscillation mechanism includes a fast forwarding gear engaging with the motor drive gear means. The first oscillation mechanism is provided to be movable among a forward play position enabling the play gear to engage with take-up reel gear means, a reverse play position enabling the play gear to engage with feed reel gear means, and an intermediate position not causing engagement of the play gear with the take-up reel gear means or the feed reel gear means. The second oscillation mechanism is provided to be movable among a fast forwarding position enabling the fast forwarding gear to engage with the take-up reel gear means, a rewinding position enabling the fast forwarding gear to engage with the feed reel gear means, and an intermediate position not causing engagement of the fast forwarding gear with the take-up reel gear means or the feed reel gear means.

Each of the above-described first and second oscillation mechanisms operates by rotation force of the motor drive gear means and thus at the time of switching from the stop mode to the play mode for example, not only the first oscillation mechanism but also the second oscillation mechanism operates. At this time, there is no particular problem if the first oscillation mechanism reaches the forward play position or the reverse play position to set the components in the play mode before the second oscillation mechanism reaches the fast forwarding position. However, if the second oscillation mechanism reaches the fast forwarding position before the first oscillation mechanism reaches the forward play position due to deviation in timing, the fast forwarding mode is temporarily set and particularly in the following situation, a considerable problem occurs.

More specifically, if the fast forwarding state is set during mode switching operation in the state where the tape cassette set in the tape player already attains a tape end, the take-up reel support is locked to apply an excessive load to the motor. In this case, switching of modes cannot be performed smoothly and it is feared that switching of modes cannot be made.

SUMMARY OF THE INVENTION

An object of the present invention is to provide an auto reverse type tape player capable of easily setting an endless mode without requiring a special switch for endless mode setting.

Another object of the present invention is to provide an auto reverse type tape player capable of accurately detecting a mode selection position and performing play mode switching operation reliably and stably.

Still another object of the present invention is to provide an auto reverse type tape player which can prevent change to fast forwarding during mode switching operation and can perform switching of modes smoothly.

An auto reverse type tape player according to an aspect of the present invention is capable of selectively switching between a one-cycle mode where upon completion of one cycle of forward play and reverse play, a tape driving motor is stopped, and an endless mode where the above-mentioned cycle is repeated without stopping the motor. This auto reverse type tape player includes: a play button for starting forward play or reverse play; means for determining whether the play button is reoperated within a prescribed period after the play button is operated first; and means for setting the endless mode or canceling the setting in response to the detection of reoperation of play button by the determining means.

By the above-described structure, the following meritorious effects can be obtained. Let us consider an auto reverse type tape player in which the endless mode is set when the play button is reoperated. In order to set the endless mode where one cycle of forward play and reverse play is repeated, it is only necessary to operate the play button twice consecutively in a prescribed period. If the user does not desire to set the endless mode, that is, if the user desires to set the one-cycle mode, it is only necessary to operate the play button once.

Next, let us consider an auto reverse type tape player in which the endless mode is set when the play button is operated first. In this case, if the user desires to set the endless mode, it is only necessary to operate the play button once. If the user does not desire to set the endless mode, that is, if the user desires to set the one-cycle mode, it is only necessary to operate the play button twice in a prescribed period.

A conventional auto reverse type tape player is provided with a special switch for endless mode setting. According to the present invention having the abovedescribed structure, the endless mode can be set by operating the play button and thus operability is improved. In addition, since a switch for endless mode setting is not required, the structure of the operation portion can be simplified. Particularly, the present invention can be advantageously applied to an auto reverse type tape player such as a headphone stereo cassette tape player which needs to have a smaller size, a lighter weight and a smaller thickness.

An auto reverse type tape player according to another aspect of the present invention includes a motor, cam means, lever means, drive means, reference time storing means, reference time correcting means, selection position detecting means, and control means. The cam means rotates from a start position to an operation mode setting position via a mode selection position using the motor as a drive source. The lever means engages with the cam member and moves according to rotation of the cam means to switch operation modes of a tape. The drive means moves the lever means to change a positional relation between the cam means and the lever means when the cam means is in the mode selection position. The reference time storing means stores in advance a reference time required for the cam means to reach the mode selection position from the start position. The reference time correcting means corrects the reference time according to a change in rotation speed of the motor. The selection position detecting means detects the cam means in the mode selection position by determining that elapsed time after start of movement of the cam means attains the corrected reference time. The control means responds to a detection signal from the selection position detecting means and controls movement of the drive means based on an inputted operation mode signal.

According to the invention having the above-described structure, the reference time is corrected successively according to the change in the rotation speed of the motor and thus the mode selection position can be always detected accurately and the positional relation between the cam means and the lever means can be changed with good timing. Thus, according to the invention, mode selecting operation can be performed reliably and stably.

An auto reverse type tape player according to a further aspect of the present invention includes: a drive mechanism including a reversible motor rotating in forward and reverse directions, take-up reel gear means for rotating a take-up reel support, feed reel gear means for rotating a feed reel support, motor drive gear means provided to rotate by a driving force of the motor, a first oscillation mechanism, a second oscillation mechanism, a mode switching mechanism, and an engaging mechanism.

The first oscillation mechanism includes a play gear engaging with the motor drive gear means. The first oscillation mechanism is movable among a forward play position enabling the play gear to engage with the take-up reel gear means, a reverse play position enabling the play gear to engage with the feed reel gear means, and an intermediate position not causing engagement of the play gear with the take-up reel gear means or the feed reel gear means.

The second oscillation mechanism includes a fast forwarding gear engaging with the motor drive gear means. The second oscillation mechanism is movable among a fast forwarding position enabling the fast forwarding gear to engage with the take-up reel gear means, a rewinding position enabling the fast forwarding gear to engage with the feed reel gear means, and an intermediate position not causing engagement of the fast forwarding gear with the take-up reel gear means or the feed reel gear means.

The mode switching mechanism is movable by a driving force of the drive mechanism among a first position corresponding to a stop mode, a second position corresponding to a play mode, a third position corresponding to a fast forwarding mode, and a fourth position corresponding to a rewinding mode. When the mode switching mechanism is in the second position, the play gear is brought to the forward play position or the reverse play position by forward rotation of the motor. When the mode switching mechanism is in the third position, the mode switching mechanism brings the fast forwarding gear to the fast forwarding position by the forward rotation of the motor. When the mode switching mechanism is in the fourth direction, it brings the fast forwarding gear to the rewinding position.

The engaging mechanism is movable by the driving force of the drive mechanism. The engaging mechanism engages with the second oscillation mechanism at the time of switching between the stop mode and the play mode, so as to temporarily stop operation of the second oscillation mechanism.

By the above-described structure, the following effects can be obtained. Since movement of the second oscillation mechanism to the fast forwarding position is stopped at the time of switching between the stop mode and the play mode, the second oscillation mechanism is reliably prevented from being in the fast forwarding state independent of the state of the tape. Accordingly, the tape player is not brought into a state making it impossible to switch modes, and thus it is possible to avoid overload to the motor and any problems caused thereby.

The foregoing and other objects, features, aspects and advantages of the present invention will become more apparent from the following detailed description of the present invention when taken in conjunction with the accompanying drawings which are given by way of illustration only, and thus are not limitative of the present invention.

BRIEF DESCRIPTION OF THE DRAWINGS

FIG. 8 is an exploded perspective view of the tape running mechanism, particularly showing a main chassis, a gear presser plate, a fast forwarding gear lever and so on. FIG. 9 is an exploded perspective view of the tape running mechanism, particularly showing a sub operation lever, a pinch roller operation lever and so on.

FIG. 10 is an exploded perspective view of the tape running mechanism, particularly showing a PAD cam, a solenoid lever, a selection lever and so on.

FIG. 11 is an exploded perspective view of the tape running mechanism, particularly showing an FWD flywheel, an REV flywheel, a slip gear, a motor and so on.

FIG. 17 is a schematic plan view showing an arrangement relationship of a print circuit board, the motor, the PAD cam and so on.

FIG. 21 is a flow chart for making correction for time T3.

FIG. 22 is a flow chart of processing from the play mode to the stop mode.

FIG. 23 is a flow chart for making correction for time T2.

DESCRIPTION OF THE PREFERRED EMBODIMENTS

Figure 1:
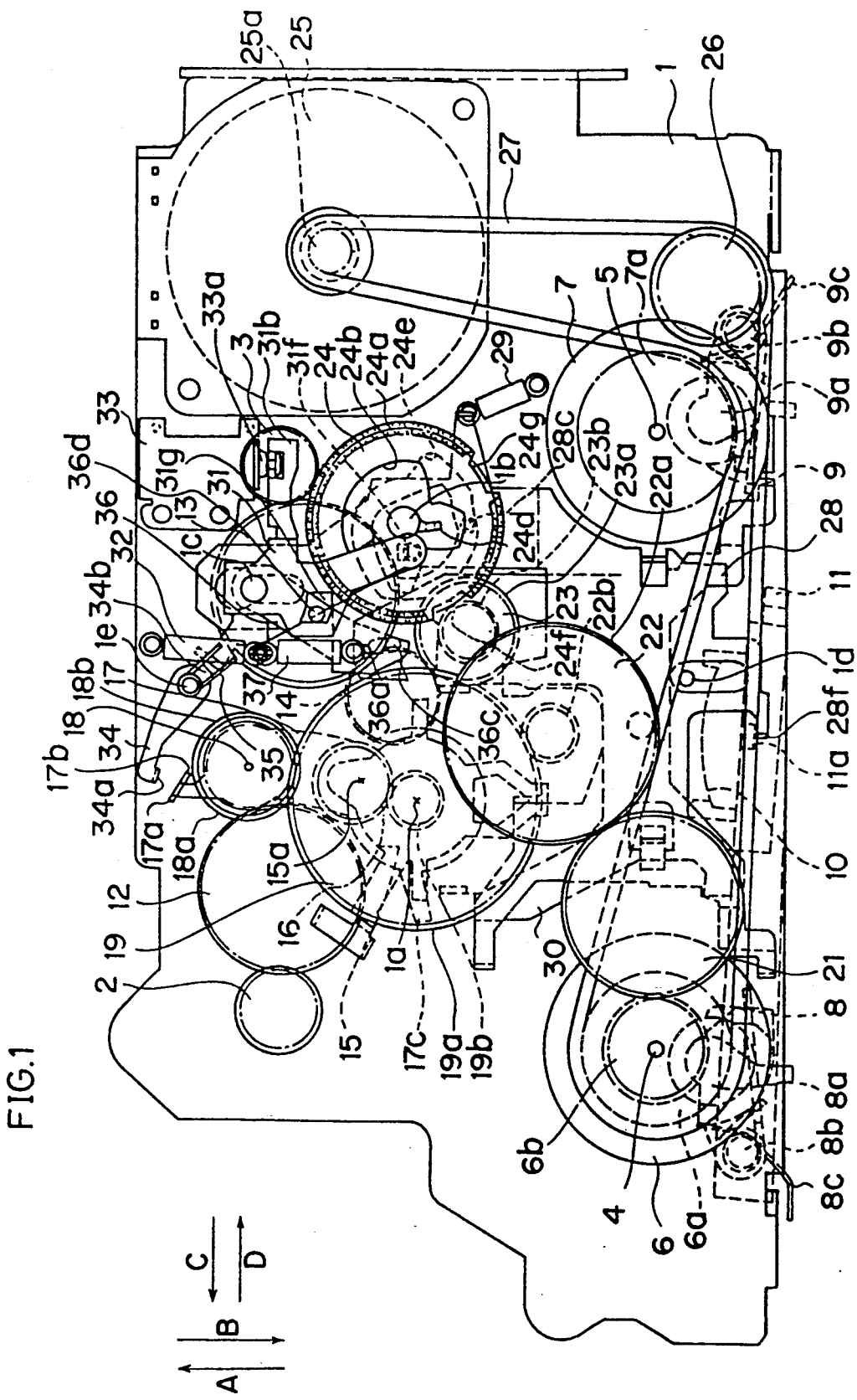
FIG. 1 is a plan view of a tape running mechanism in a fast forwarding (FF) mode and in a second stop mode according to an embodiment of the present invention.

A headphone stereo cassette tape player according to an embodiment of the present invention will be hereinafter described in detail with reference to the drawings.

FIGS. 1 to 7 are plan views representing respective modes of a tape running mechanism of the headphone stereo cassette tape player in the embodiment of the present invention, and FIGS. 8 to 11 are perspective views showing assembling of the above-mentioned tape running mechanism.

Referring to FIGS. 1 to 11 (particularly FIGS. 1 and 8), a main chassis 1 includes a take-up reel support and a feed reel support on the tape cassette loading side (i.e., the front surface of the chassis 1) and those reel supports have respective reel shafts projecting on the rear surface of the chassis 1, with their ends having a take-up gear 2 and a feed gear 3, respectively. A forward side (hereinafter referred to simply as FWD) capstan shaft 4 and a reverse side (hereinafter referred to simply as REV) capstan shaft 5 project on the front surface of the main chassis 1, and an FWD flywheel 6 and an REV flywheel 7 are attached to the ends of the capstan shafts 4 and 5 projecting on the rear surface. The flywheels 6 and 7 have pulleys 6a and 7a, and the FWD flywheel 6 further has a gear 6b.

An FWD pinch roller 8 and an REV pinch roller 9 are disposed on the front surface of the main chassis 1, and further a sub chassis 11 having a magnetic head 10 is disposed on the front surface. The two pinch rollers 8, 9 are supported rotatably at ends of pinch levers 8a, 9a on one side, and the other ends of the pinch levers 8a, 9a are supported rotatably on shafts 8b, 9b, so that the pinch rollers 8, 9 are constantly maintained at positions separated from the capstan shafts 4, 5 by means of springs 8c, 9c, respectively.

The sub chassis 11 has one end supported rotatably on the shaft 8b and it maintains the magnetic head 10 constantly at a position separated from a tape surface by means of a spring (not shown).

The main chassis 1 supports rotatably an FWD idler gear 12, an REV idler gear 13, and an REV idler coupling gear 14. The FWD idler gear 12 engages with the take-up gear 2, and the REV idler gear 13 engages with the feed gear 3 and the REV idler coupling gear 14.

Figure 12:
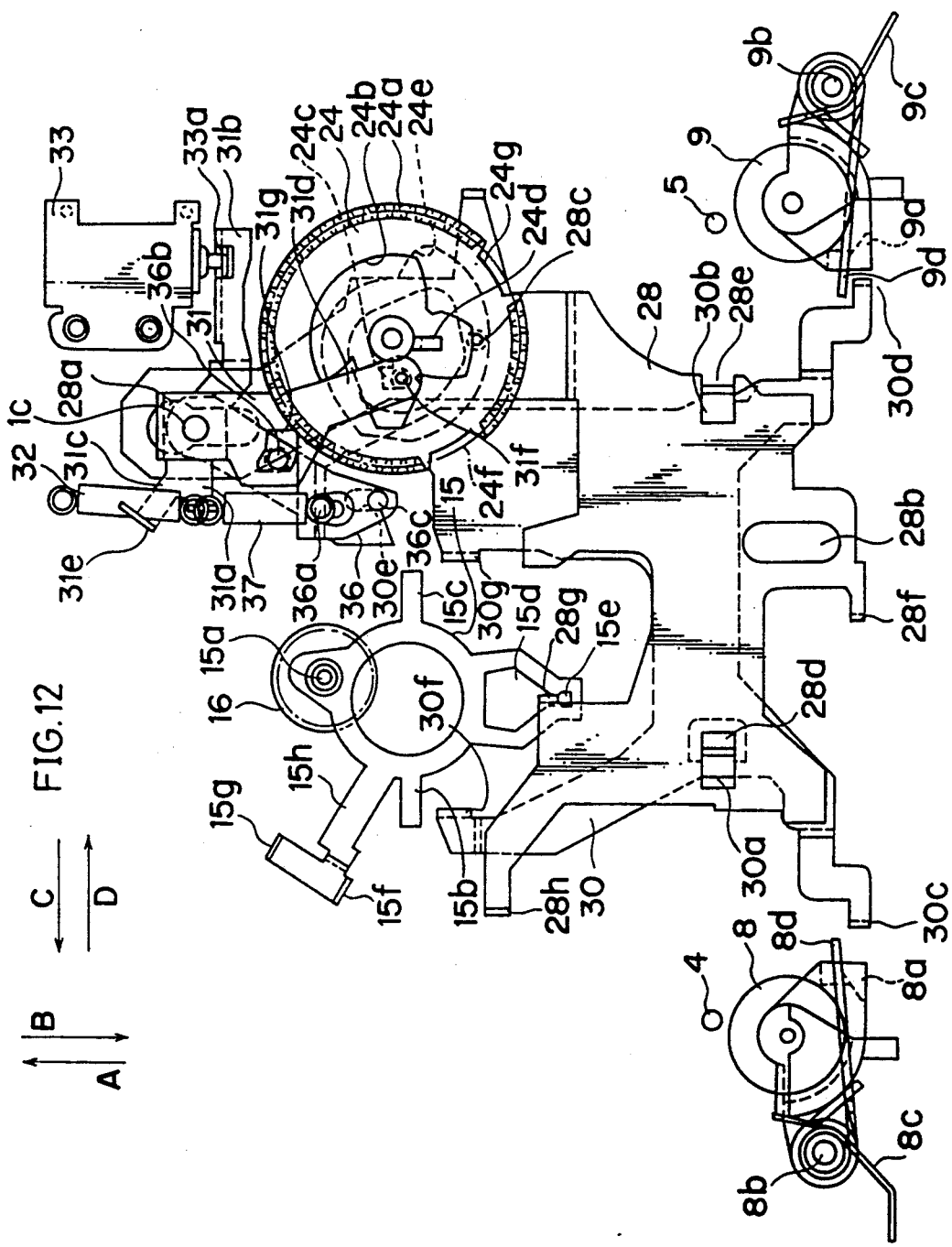
FIG. 12 is a plan view of the tape running mechanism in the play mode and in the first stop mode.

A play gear shown in FIG. 12 lever 15 is supported rotatably around a shaft 1a on the main chassis 1, and a play gear 16 is supported rotatably on a shaft 15a at a suitable position of the play gear lever 15. The play gear lever 15 has a position where the play gear 16 is selectively engaged with the FWD idler gear 12 and the REV idler coupling gear 14 by rotation around the shaft 1a, and a neutral position where the play gear 16 is not engaged with either of the gears. The play gear lever 15 and the play gear 16 etc. constitute a first oscillating mechanism.

A fast forwarding gear lever 17 is supported rotatably around the shaft 1a on the main chassis 1 and it supports rotatably fast forwarding gears 18a, 18b of the same diameter on both sides of its free end by means of a shaft 18.

The fast forwarding gear lever 17 has a fast forwarding (FF) position enabling the gear 18a to engage with the FWD idler gear 12, and a rewinding (REW) position enabling the gear 18a to engage with the REV idler gear 13, and a neutral position not causing the gear 18a to engage with either gear. The fast forwarding gear lever 17 together with the fast forwarding gears 18a, 18b etc. constitutes a second oscillating mechanism.

Figure 11:
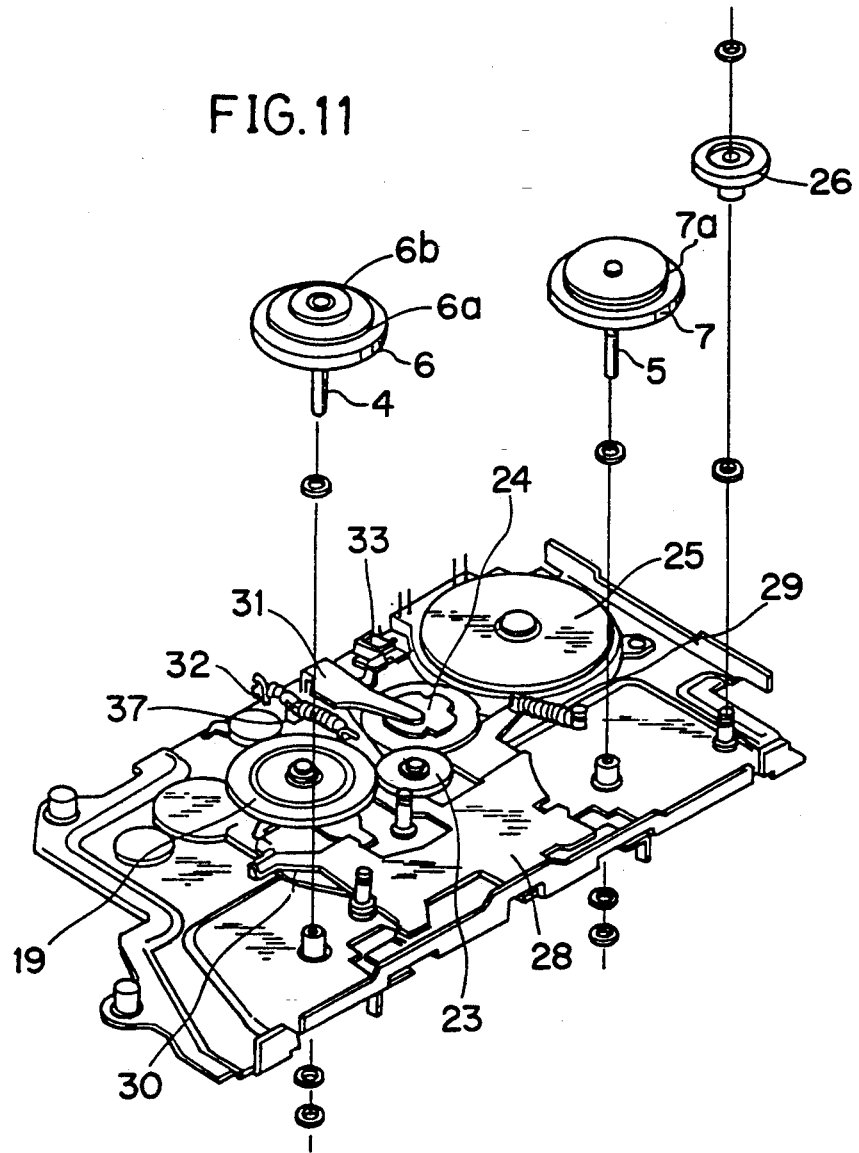

A slip gear 19 (as shown in FIGS. 1 and 11) is a two-stage gear supported rotatably around the shaft 1a on the main chassis 1. A gear 19a of a larger diameter engages with the other fast forwarding gear 18b, and a gear 19b of a smaller diameter engages with the play gear 16.

Figure 8:
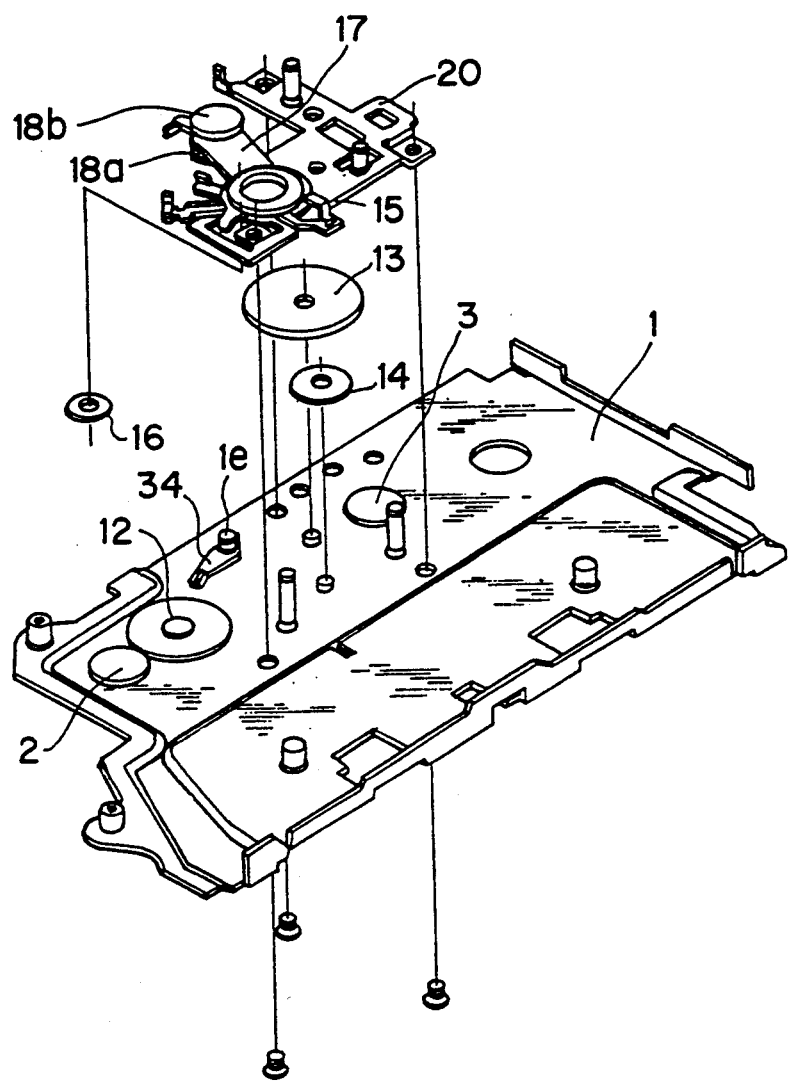

The REV idler gear 13 and the REV idler coupling gear 14 are supported by using a gear presser plate 20 (as shown in FIG. 8). The gear presser plate 20 is attached to the main chassis 1, although it is not shown for the purpose of simplification in figures except for FIGS. 8 to 11.

A drive transmission gear 21 and a drive conversion gear 22 are supported rotatably on the main chassis 1. The drive transmission gear 21 engages with the gear 6b and a gear 22a of a larger diameter of the drive conversion gear 22. The drive conversion gear 22 is a two-stage gear and the other gear 22b of a smaller diameter engages with a large-diameter gear 19a of a slip gear 19. A cam drive gear 23 is a two-stage gear supported rotatably on the main chassis 1, and it has a large-diameter gear 23a engaging with the large-diameter 23b engaging with a gear of a PAD cam 24 to be described afterwards.

The PAD cam 24 (shown in FIGS. 1, 10 and 12) is supported rotatably around the shaft 1b on the main chassis 1. The PAD cam 24 has a gear 24a on its outer circumference, and a cam member 24b and lock portions 24c, 24d are formed on one surface of the cam 24, while a groove cam member 24e is formed on the other surface thereof. The gear 24a of the PAD cam 24 has non-toothed portions 24f, 24g at suitable positions.

A motor 25 is attached to the main chassis 1. It is a brushless or coreless motor rotatable in forward and reverse directions. A belt 27 is placed between a motor pulley 25a and an intermediate pulley 26, as well as between the motor pulley 25a and pulleys 6a, 7a of the flywheels 6, 7.

Figure 9:
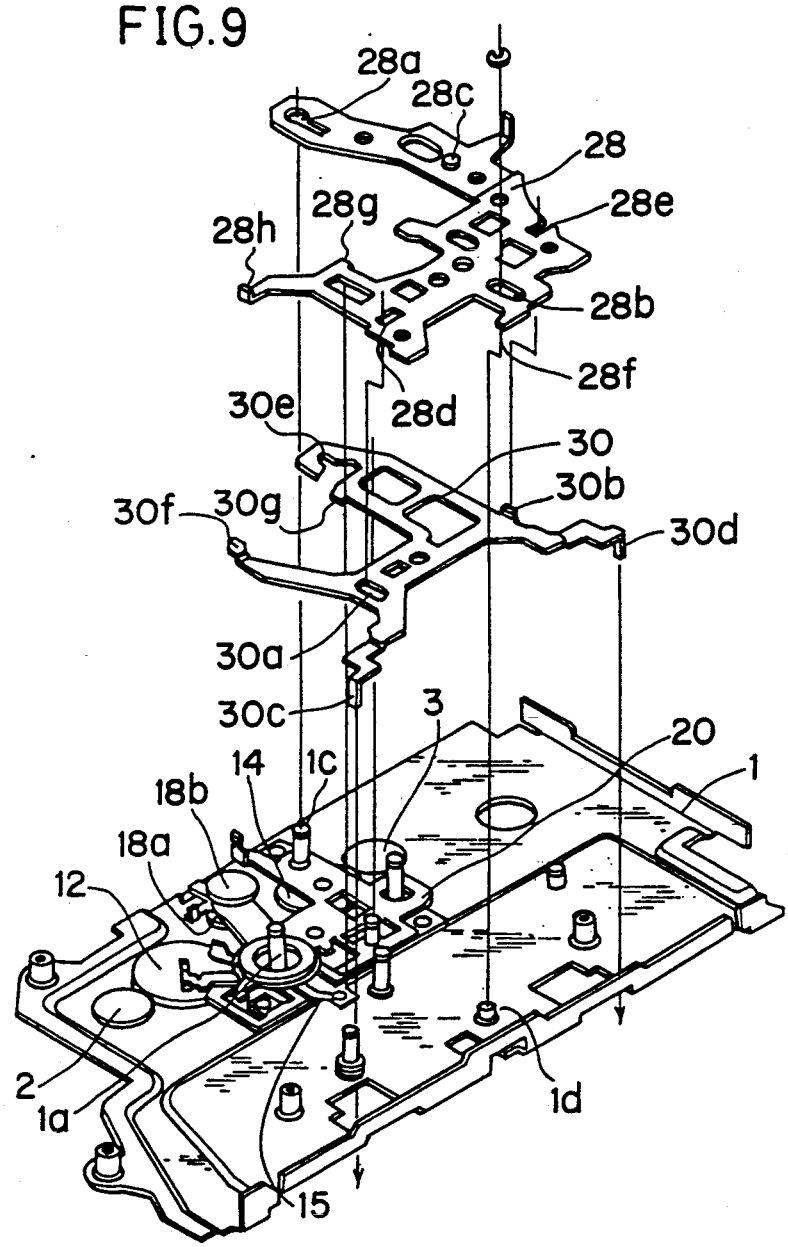

A sub operation lever 28 (as shown in FIG. 9) is provided movably in the directions of the arrows A, B within the ranges of elongate holes 28a, 28b in which shafts 1c, 1d provided on the gear presser plate 20 and the main chassis 1 are inserted, respectively, and the lever 28 is constantly actuated in the direction of the arrow B by means of a spring 29. The sub operation lever 28 has a pin 28c at a suitable position and this pin 28c is brought into contact with the cam member 24e of the PAD cam 24, whereby the lever 28 moves in the directions of the arrows A, B by means of the cam member 24e when the PAD cam 24 is rotated (as shown in FIG. 12). Further, the sub operation lever 28 has a projecting pressing portion 28f, which contacts a contact portion 11a of the sub chassis 11. According to the movement of the sub operation lever 28 in the direction of the arrow A, the sub chassis 11 advances in opposition to the spring, causing the magnetic head 10 to contact the tape surface.

The sub operation lever 28 has a switch operating portion 28h and when the lever 28 moves in the direction of the arrow A, a play mode detection switch (not shown) is turned on by means of the switch operating portion 28h.

A pinch roller operation lever 30 (as shown in FIGS. 9 and 12) has bending portions 30a, 30b inserted in openings 28d, 28e, respectively, whereby the lever 30 moves together with the sub operation lever 28 in the directions of the arrows A, B and is movable in the directions of the arrows C, D in the ranges of the openings 28d, 28e. The pinch roller operation lever 30 has pinch roller operating portions 30c, 30d. When the lever 30 moves in the direction of the arrow C, the pinch roller operating portion 30c is located opposite to a spring 8d for operating the FWD pinch roller 8, and when the lever 30 moves in the direction of the arrow D, the pinch roller operating portion 30d is located opposite to a spring 9d for operating the REV pinch roller 9. Then, when the pinch roller operation lever 30 moves in the direction of the arrow A, the spring 8d (or 9d) is operated by means of the pinch roller operating portion 30c (or 30d) to press the pinch roller 8 (9) against the capstan shaft 4 (5).

Referring to FIGS. 1 and 12, description will be made of relationships of the play gear lever 15, the fast forwarding gear lever 17 with the sub operation lever 28, the pinch roller operation lever 30. The play gear lever 15 has right and left projecting contact portions 15b, 15c, an almost pentagonal hole 15d, and a slit 15e continuous with the hole 15d. The pinch roller operation lever 30 has a bending portion 30f to be opposite to the contact portion 15b when the lever 30 moves in the direction of the arrow D, and a bending portion 30g to be opposite to the contact portion 15c when the lever 30 moves in the direction of the arrow C. When the pinch roller operation lever 30 moves in the direction of the arrow A, the bending portion 30f (30g) pushes the contact portion 15b (15c) to rotate the play gear lever 15 clockwise (counterclockwise). The sub operation lever 28 has a bending portion 28g which is inserted movably in the hole 15d of the play gear lever 15. When the sub operation lever 28 moves in the direction of the arrow B, the bending portion 28g is fitted in the slit 15e continuous with the hole 15d, whereby the play gear lever 15 is returned to the neutral position and is maintained in the neutral position. The play gear lever 15 includes a projecting portion 15h having switch operating portions 15f, 15g. When the lever 15 rotates clockwise, an FWD/REV detection switch (not shown) is operated by means of the switch operating portion 15f, and when the lever 15 rotates counterclockwise, the FWD/REV detection switch is operated by means of the switch operating portion 15g.

The fast forwarding gear lever 17 has a projecting contact portion 17c to be opposite to the bending portion 30f of the pinch roller operation lever 30. When the pinch roller operation lever 30 moves in the direction of the arrow A and is located in a prescribed position, the fast forwarding gear lever 17 is prevented from rotating counterclockwise from the neutral position, as a result of contact between the bending portion 30f and the contact portion 17c. In other words, the fast forwarding gear 18a is prevented from engaging with the FWD idler gear 12.

Figure 10:
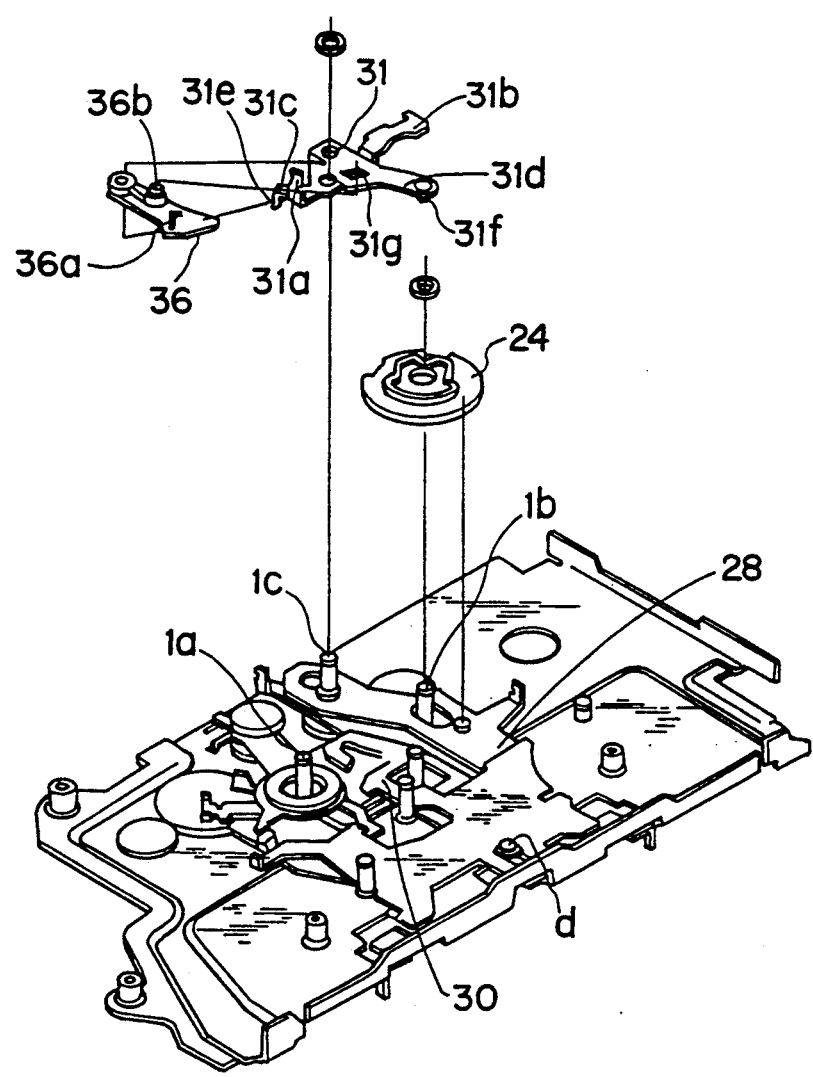

A solenoid lever 31 (as shown in FIGS. 1, 10 and 12) is supported rotatably around the shaft 1c and it has arms 31a to 31d extending in four directions. The solenoid lever 31 has a bent form including a portion having the arms 31a to 31c and a portion having the arm 31d with those portions being located at a prescribed angle from each other around the shaft 1c. A spring 31 is disposed between the arm 31a and the main chassis 1 to actuate the lever 31 constantly clockwise around the shaft 1c.

The arm 31b is connected to an iron core 33a of the solenoid 33 mounted on the main chassis 1. The solenoid 33 is of a self-holding type. When the solenoid 33 is in a non-conducting state, it absorbs and holds the iron core 33a by means of an incorporated permanent magnet in opposition to the actuating force of the spring 32. When the solenoid 33 is in a conducting state, it generates a magnetic force opposite to the absorbing direction of the permanent magnet and a resultant force of the magnetic force and the actuating force of the spring 32 overcomes the absorbing force of the permanent magnet to rotate the solenoid lever 31 clockwise and thus the iron core 33a is separated from the permanent magnet When the iron core 33a is separated from the permanent magnet at a prescribed distance, the permanent magnet does not absorb the iron core 33a if the conduction of the solenoid 33 is stopped.

Figure 2:
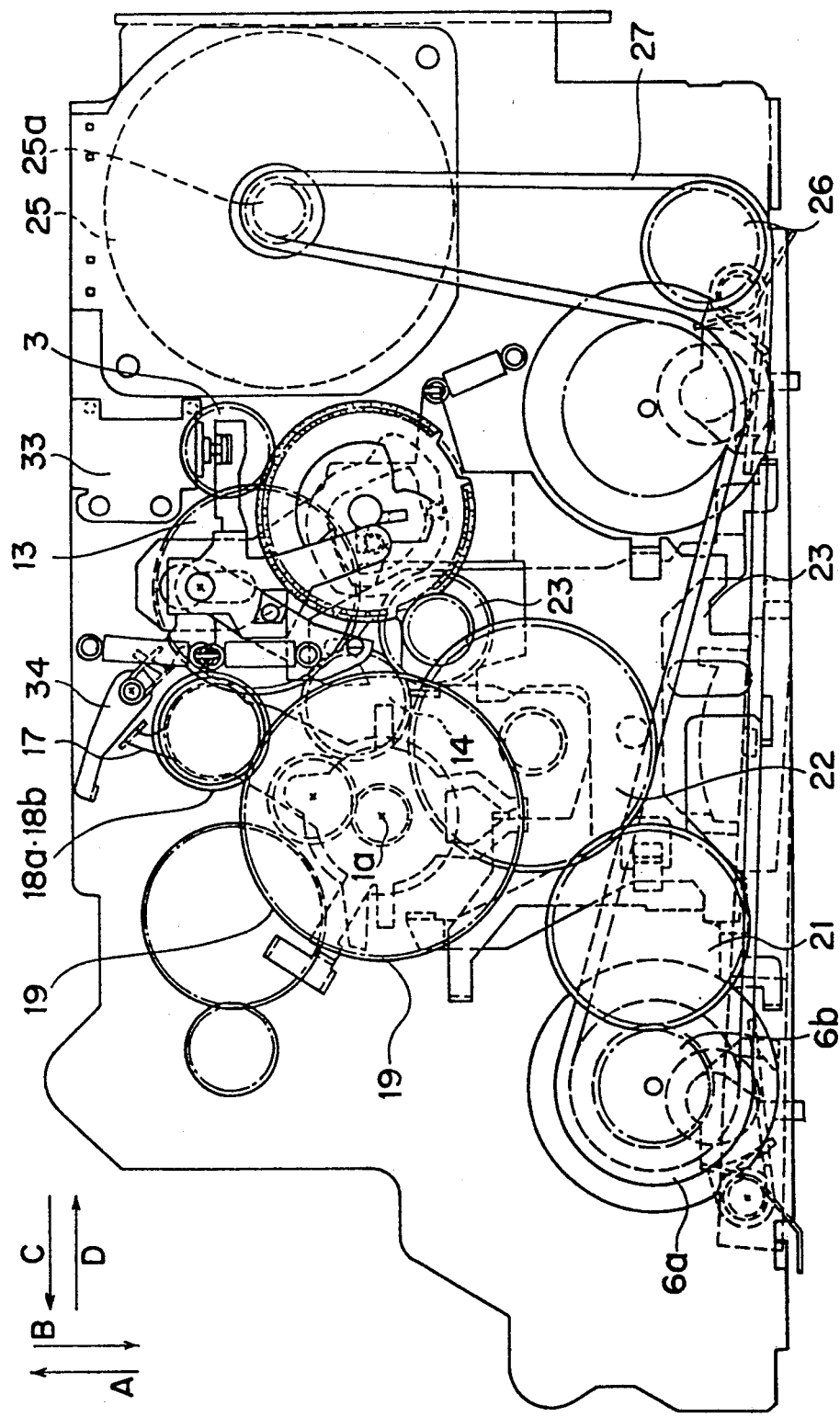
FIG. 2 is a plan view of the tape running mechanism in a rewinding (REW) mode and in a third stop mode.
Figure 3:
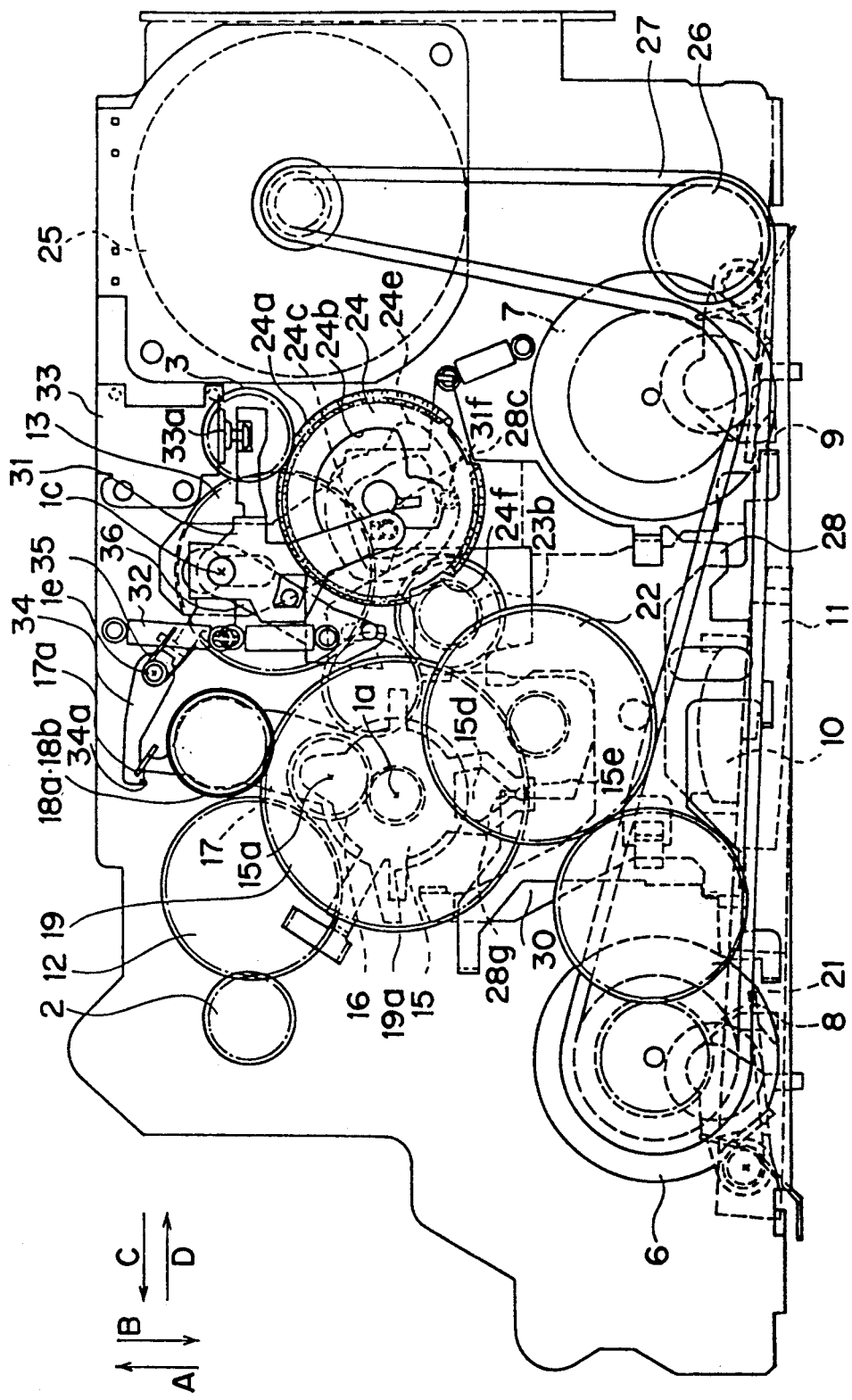
FIG. 3 is a plan view of the tape running mechanism in a play mode and in a first stop mode.

The arm 31c cooperates with a fast forwarding engaging lever 34 (as shown in FIGS. 1, 2 and 3). The fast forwarding engaging lever 34 is supported rotatably around the shaft 1e on the main chassis 1, and it has an engaging portion 34a at one end and a bending portion 34b at the other end. The fast forwarding engaging lever 34 supports a torsion spring 35. The bending portion 34b, and a projecting portion 31e at the top end of the arm 31c of the solenoid lever 31 are located between both ends of the torsion spring 35, whereby the fast forwarding engaging lever 34 rotates together with the solenoid lever 31 by means of the torsion spring 35. The engaging portion 34a engages with and disengages from a left portion 17a of a T-shaped top end of the fast forwarding gear lever 17 by rotation of the fast forwarding engaging lever 34. A right portion 17b of the T-shaped top end prevents the engaging portion 34a of the fast forwarding engaging lever 34 from entering a right side portion in the figure of the fast forwarding gear lever 17.

Referring to FIG. 12, the arm 31d of the solenoid lever 31 has a projecting pin 31f, which is associated with the cam member 24b and lock portions 24c, 24d of the PAD cam 24.

A selection lever 36 (as shown in FIGS. 10 and 12) is supported rotatably around the shaft 1c in the same manner as in the case of the solenoid lever 31, and the selection lever 36 is actuated constantly clockwise around the shaft 1c by means of a spring 37 provided between a spring engaging portion 36a and the arm 31a of the solenoid lever 31. The selection lever 36 has a projecting pin 36b at a suitable position. The pin 36b is inserted movably in an almost parallelogram hole 31g formed in the solenoid lever 31, and the pin 36b is pressed against the left edge of the hole 31g by the actuating force of the spring 37. Thus, the solenoid lever 31 and the selection lever 36 can be rotated together around the shaft 1c by means of the spring 37.

In addition, the selection lever 36 has another pin 36c on the surface opposite to the surface including the above-mentioned pin 36b. The pin 36c is inserted movably in a guide hole 30e formed in the pinch roller operation lever 30, causing the pinch roller operation lever 30 to move in the directions of the arrows C, D by rotation of the selection lever 36.

The above-mentioned PAD cam 24, motor 25, solenoid 33, selection lever 36 and so on constitute a driving mechanism for switching modes in the respective components. The fast forwarding engaging lever 34, torsion spring 35 and so on constitute an engaging mechanism for engaging the fast forwarding gear lever 17 to prevent the counterclockwise rotation of the lever 17, namely, the movement thereof to the FF position.

The above-mentioned sub operation lever 28, pinch roller operation lever 30 and so on constitute a mode selection mechanism operated by the above-mentioned driving mechanism to select any mode such as a play mode, a fast forwarding mode, or a rewinding mode.

FIGS. 12 to 16 are explanatory views showing operations of the PAD cam 24 and other components.

Figure 17:
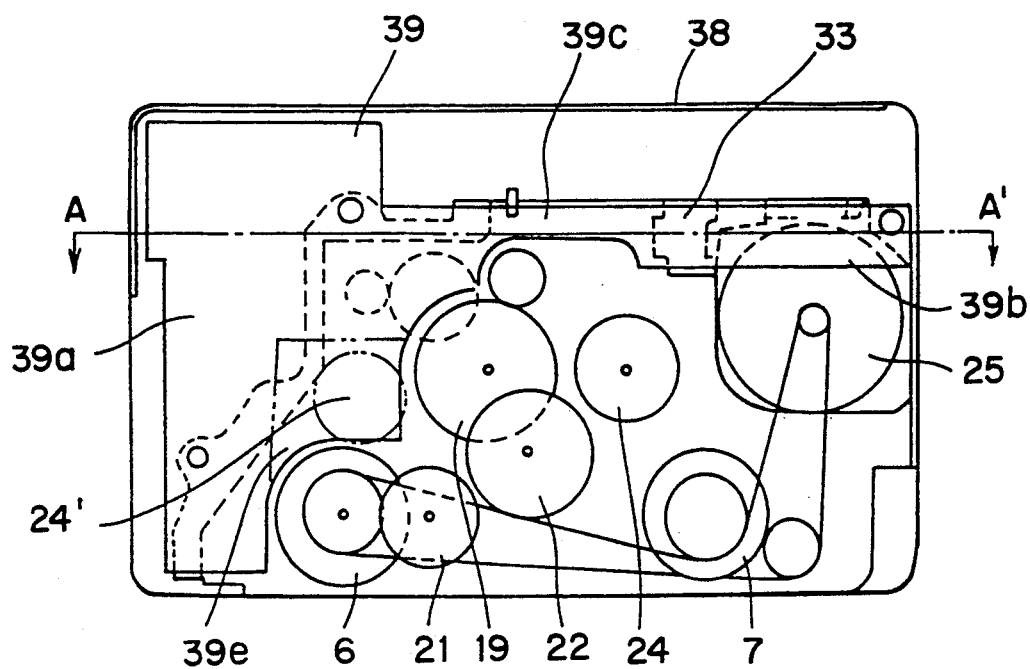
Figure 18:
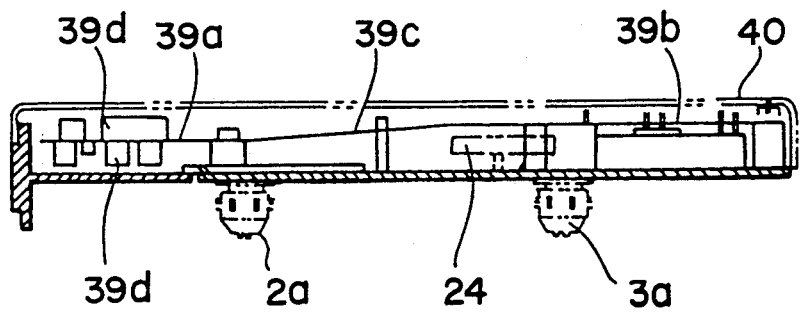
FIG. 18 is a cross sectional view taken along A—A' in FIG. 17.

FIG. 17 is a schematic plan view showing an arrangement of a printed circuit board, a motor and the PAD cam etc., and FIG. 18 is a cross sectional view taken along A—A' of FIG. 17. Referring to FIGS. 17 and 18, a main frame 38, together with the main chassis 1, a cabinet 40 etc. constitute an outer shape of the main body of the player, and a printed circuit board 39 is formed integrally with a control circuit board portion 39a and a drive board portion 39b by one plate by means of a narrow coupling portion 39c, with necessary electric components 39d being mounted on front and rear surfaces of the control circuit board portion 39a. As can be seen from FIG. 18, the control circuit board portion 39a and the driving board portion 39b of the printed circuit board 39 are located at different levels by making use of flection of coupling portion 39c. The reason for this arrangement is as follows. The maximum height of the electric component 39d mounted on the control circuit board portion 39a is different from the heights of the motor 25 and solenoid 33 mounted on the driving board portion 39b and, if the two board portions 39a and 39b are located at the same level, the thickness of the main body of the player would be increased. Thus, the board portions 39a and 39b are mounted at the different levels, whereby the main body of the player can be made thin.

In the above-described structure, the PAD cam 24 according to the embodiment is located near the motor 25 and solenoid 33, which makes it possible to further reduce the outer shape of the main body of the player. The reason for this is described below.

In the prior art, the PAD cam was located in a position shown by the reference character 24' (as shown in FIG. 17) and accordingly, it would be necessary to remove the portion 39e surrounded by the chain line in the printed circuit board 39 to ensure the space for the cam. As a result, an insufficient space for the electric component 39d would be compensated for by an external portion of the control circuit board portion 39a (on the side opposite to the tape running mechanism), causing an increase of the main frame 39 and accordingly an increase of the size of the main body of the player. By contrast, according to the embodiment of the invention, the PAD cam 24 is located in proximity to the motor 25 and solenoid 33, which makes it possible to solve the above-mentioned problem and to reduce the size of the main body of the player.

In FIG. 18, the reference characters 2a denote the take-up reel support, and the reference characters 3a denote the feed reel support.

Figure 19:
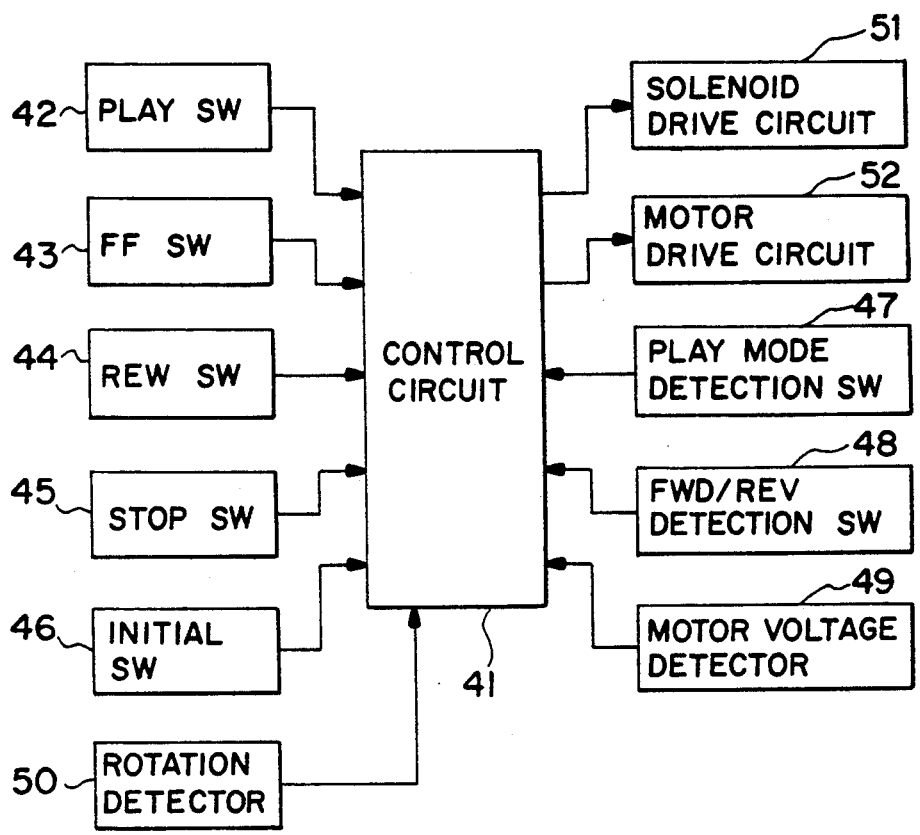
FIG. 19 is a block diagram showing a control system of a tape player.

FIG. 19 is a block diagram showing a control system of the above-described tape player. Referring to FIG. 19, the control system includes a control circuit 41 formed mainly by a microcomputer, a play switch 42, a fast forwarding (FF) switch 43, a rewinding (REW) switch 44, and a stop switch 45. The switches 42 to 45 are operated by a play button, an FF button, an REW button and a stop button, respectively. The control system further includes: an initial switch 46 which is turned on when an ejection button for ejecting the tape cassette is operated, when a headphone or earphone jack is detached from the main body of the player, or when a battery supply is removed from the main body of the player; a play mode detection switch 47 which detects a play mode by movement of the sub operation lever 28; an FWD/REV detection switch 48 which detects an FWD/REV condition by movement of the play gear lever 15; a motor voltage detector 49 which detects voltage supplied to the motor 25; and a rotation detector 50 which detects rotation of the FWD idler gear 12. The rotation detector 50 is formed for example by a photo-coupler. A surface of the FWD idler gear 12 has a black-and-white striped pattern as known in the prior art, and when the idler gear 12 rotates, the rotation detector 50 generates pulses periodically. The control system further includes a solenoid drive circuit 51, and a motor drive circuit 52.

Control and signal processing of the respective components by the control circuit 41 will be described in the following description of operation of the player with reference to flow charts of FIGS. 20 to 25.

The operation of the headphone stereo cassette tape player of the embodiment of the present invention will be described.

The stop mode includes three modes, namely, the first stop mode (as shown in FIG. 3) changed from the play mode, the second stop mode (as shown in FIG. 1) changed from the FF mode, and the third stop mode (as shown in FIG. 2) changed from the REW mode. FIG. 12 represents an operation condition common to each of the stop modes since the fast forwarding gear lever 17 and the fast forwarding engaging lever 34 are not shown.

First stop mode:

As shown in FIGS. 3 and 12, in this first stop mode, the components are in the following states. The sub chassis 11 and the sub operation lever 28 are moved in the direction of the arrow B and the pinch roller operation lever 30 is moved in the direction of the arrow D. The play gear lever 15 maintains the play gear 16 in the neutral position and the fast forwarding gear lever 17 maintains the fast forwarding gear 18a in the neutral position with the left portion 17a of the lever 17 being engaged with the engaging portion 34a of the fast forwarding engaging lever 34. The non-toothed portion 24f of the PAD cam 24 is opposed to the small-diameter gear 23b of the cam drive gear 23 and the pin 31f of the solenoid lever 31 is engaged with the lock portion 24c of the cam 24. Needless to say, the FWD and REV pinch rollers 8, 9 are separated from the capstan shafts 4, 5.

First stop mode→play mode:

When the play switch 42 is turned on by pressing the play button, the control circuit 41 determines the turn-on of the play switch 42 and stores the setting of the play mode in memory. At the same time, the control circuit 41 reads a control program of the play mode from the memory and performs the following control operation.

Figure 20:
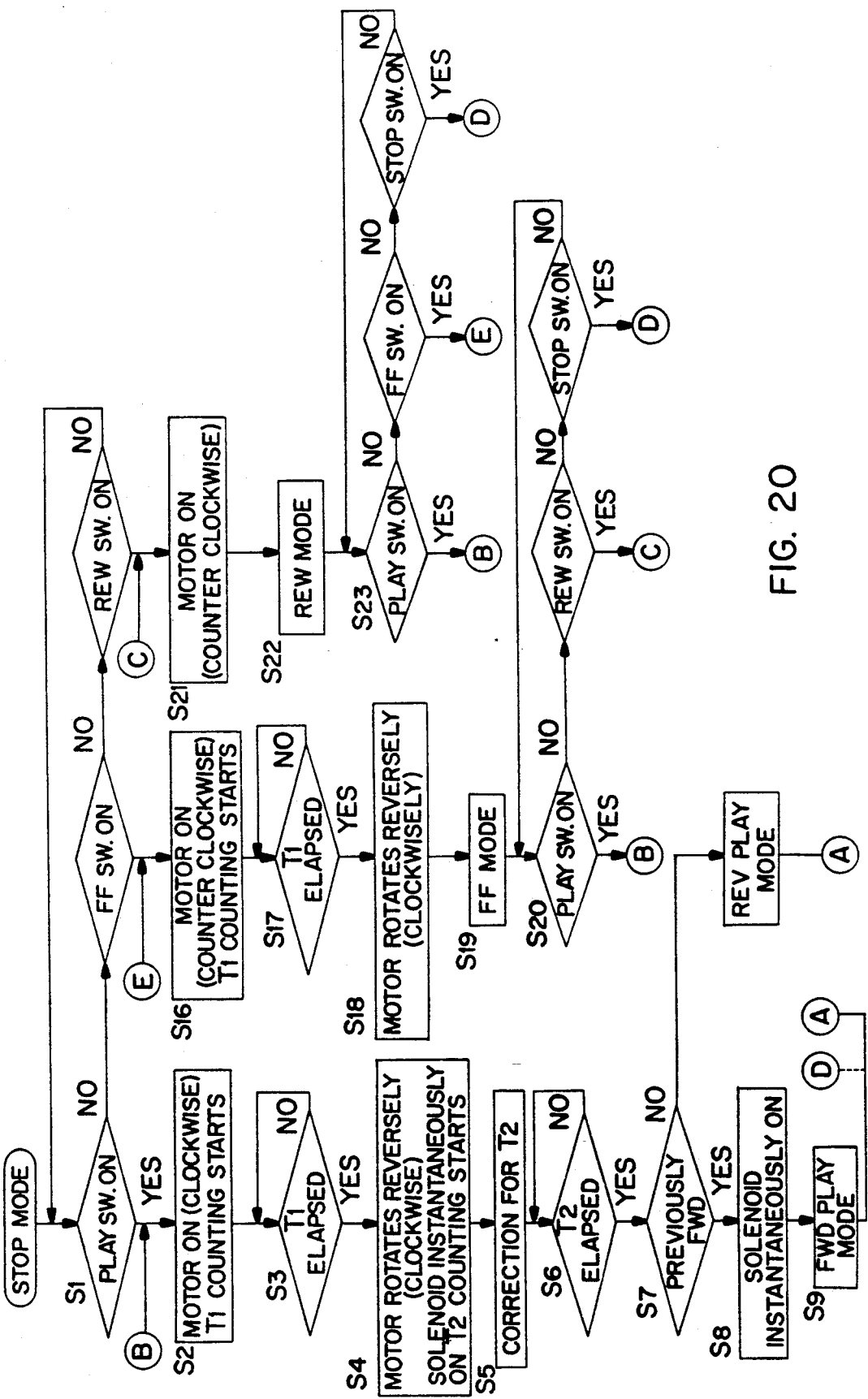
FIG. 20 is a flow chart for control after turn-on of a play switch, an FF switch and an REW switch.

When the control circuit 41 determines the turn-on of the play switch 42 in step S1 of the flow chart of FIG. 20, the control circuit 41 supplies a signal to the motor drive circuit 52 in step S2 to drive the motor 25 counterclockwise and to start counting for time T1.

When the motor 25 rotates counterclockwise, the rotation force is transmitted to the slip gear 19 through the belt 27, gear 6b, drive transmission gear 21, and drive conversion gear 22, so that the slip gear 19 rotates clockwise. Then, the fast forwarding gear lever 17 having the fast forwarding gear 18b engaged with the large-diameter gear 19a rotates clockwise around the shaft 15a. As a result of the rotation, the engagement between the left portion 17a and the engaging portion 34a of the fast forwarding engaging lever 34 is canceled, and the fast forwarding engaging lever 34 is rotated clockwise around the shaft 1e by the elastic force of the torsion spring 35, causing the engaging portion 34a to be moved to a position avoiding the engagement with the left portion 17a.

The above-mentioned time T1 is a very short time which is predetermined based on time required for at least the engaging portion 34a to disengage from the left portion 17a from the start of drive of the motor 25.

When the elapse of the time T1 is determined in step S3, the processing flow proceeds to step S4, in which a signal is supplied to the motor drive circuit 52 to reverse the rotation of the motor 25, namely, to rotate the motor 25 clockwise, and a signal is supplied to the solenoid drive circuit 51 to conduct the solenoid 33 with a single pulse and to start operation thereof, and counting for time T2 is started.

The solenoid 33 generates a magnetic force instantaneously by the conduction with the single pulse. Then, a resultant force of the magnetic force and the actuating force of the spring 32 overcomes the absorbing force of the internal permanent magnet of the solenoid 33 to rotate the solenoid lever 31 clockwise around the shaft 1c and to project the iron core 33a. Although the conduction of the solenoid 33 is effected instantaneously, the solenoid lever 31 is kept rotated clockwise by the actuating force of the spring 32.

Figure 4:
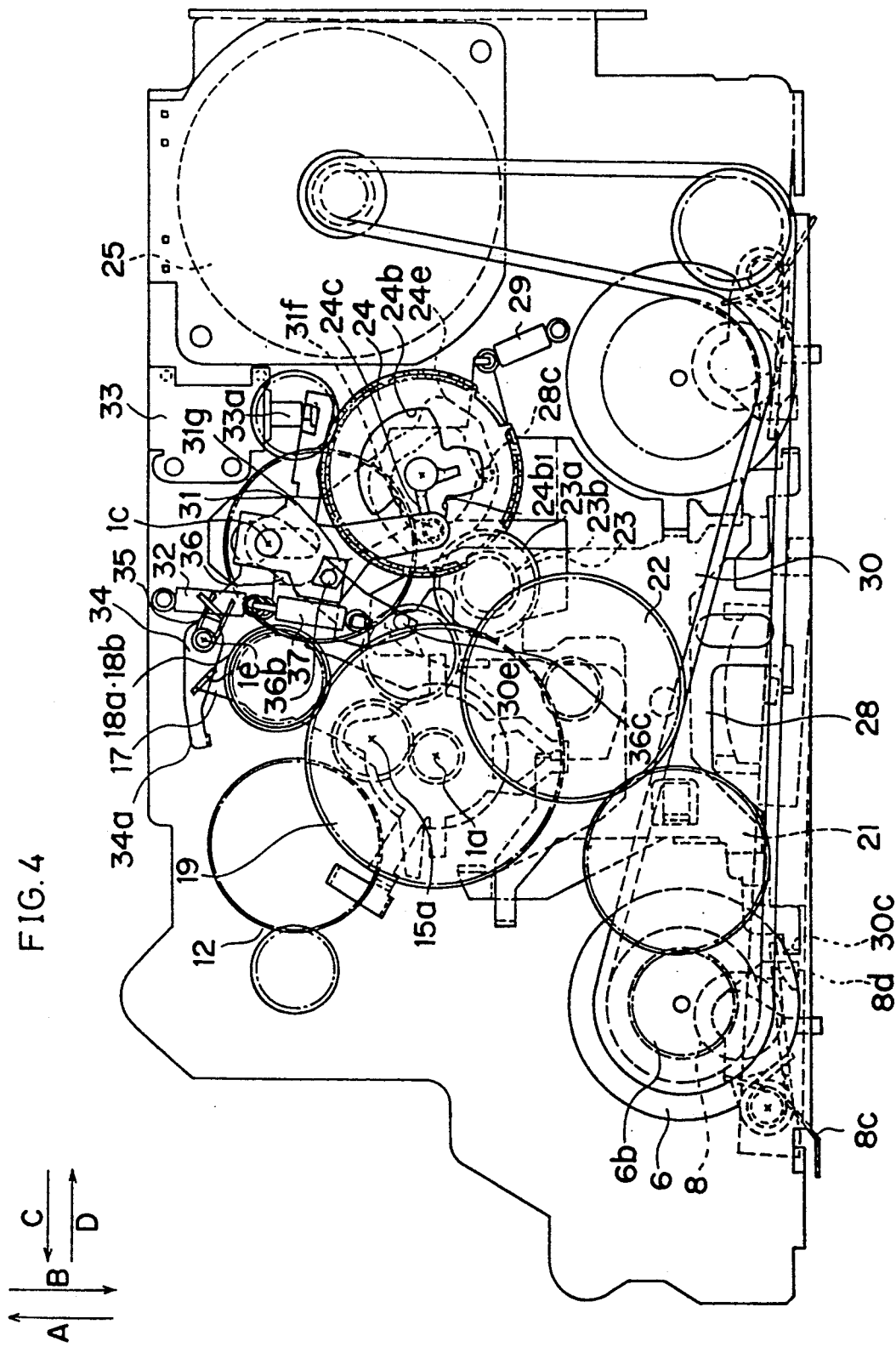
FIG. 4 is a plan view of the tape running mechanism immediately after start of operation of a solenoid during change from the first stop mode to a forward (FWD) play mode.
Figure 13:
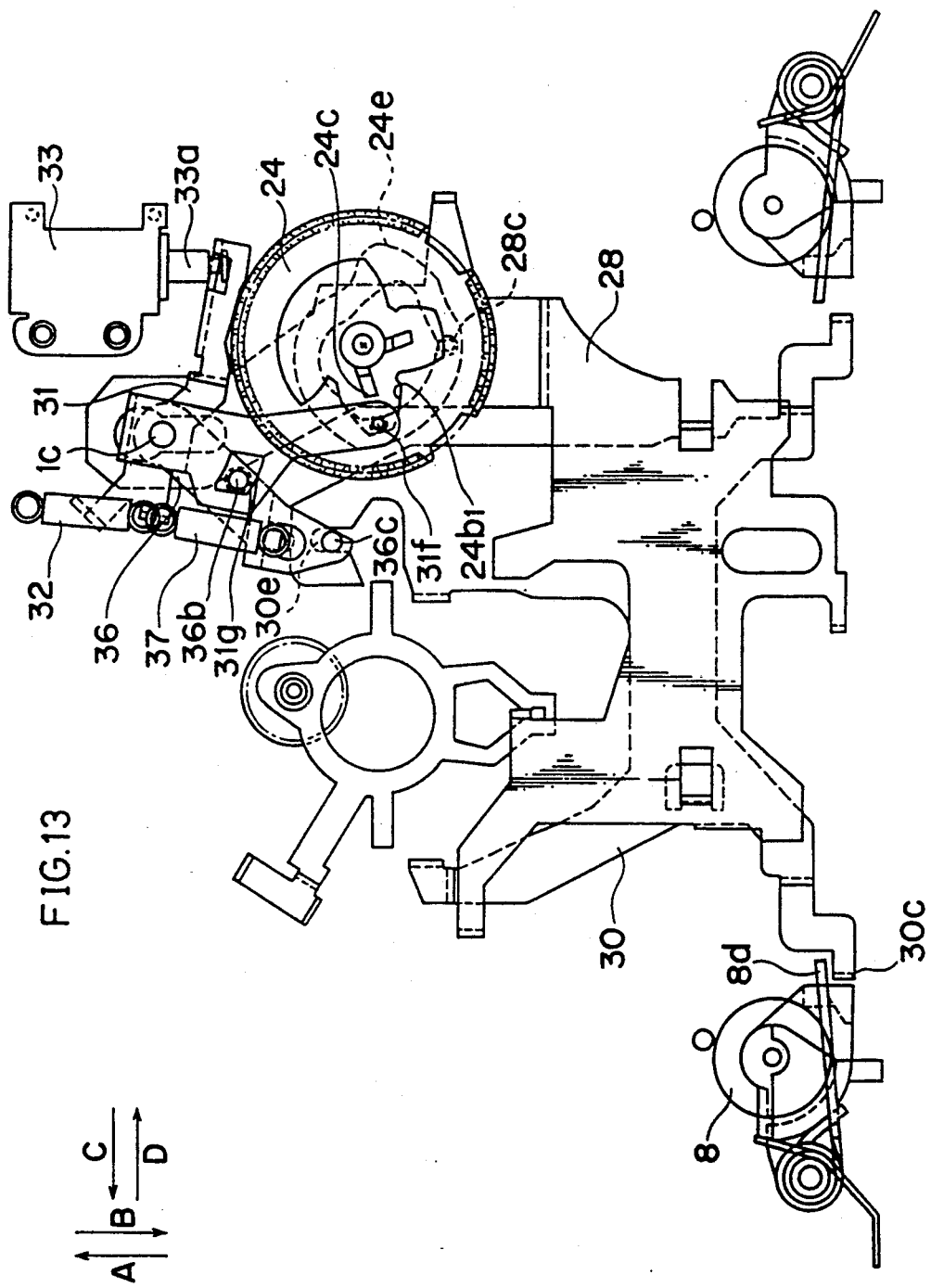
FIG. 13 is a plan view of the tape running mechanism immediately after start of operation of a solenoid during change from the first stop mode to the FWD play mode.

The state immediately after the start of operation of the solenoid 33 is shown in FIGS. 4 and 13. The solenoid lever 31 rotates clockwise to move the pin 31f away from the lock portion 24c of the PAD cam 24 and to rotate the fast forwarding engaging lever 34 counterclockwise around the shaft 1e through the torsion spring 35, thereby returning it to the initial position. Since the fast forwarding engaging lever 34 is returned to the initial position, when the fast forwarding gear lever 17 rotates counterclockwise around the shaft 15a according to the clockwise rotation of the motor 25, the fast forwarding engaging lever 34 engages with the fast forwarding gear lever 17, whereby the fast forwarding gear 18a is prevented from engaging with the FWD idler gear 12 and thus the FF condition is prevented from being set.

The pin 31f coming out from the lock portion 24c pushes a cam surface 24b1 of the cam member 24b to apply a counterclockwise rotation force to the PAD cam 24. As a result, the gear 24a of the PAD cam 24 engages with the small-diameter gear 23b of the cam drive gear 23.

The selection lever 36 rotates clockwise around the shaft 1c together with the solenoid lever 31 through the spring 37, whereby the pin 36c pushes a wall surface of the guide hole 30e of the pinch roller operation lever 30 to move the pinch roller operation lever 30 in the direction of the arrow C.

The clockwise rotation force of the motor 25 is transmitted to the cam drive gear 23 through the belt 27, the gear 6b of the FWD flywheel 6, the drive transmission gear 21, the drive conversion gear 22, and the slip gear 19, and the clockwise rotation of the cam drive gear 23 causes the PAD cam 24 engaged with the small-diameter gear 23b to rotate counterclockwise.

The counterclockwise rotation of the PAD cam 24 causes a cam surface 24b2 of the cam member 24b to be pressed against the pin 31f, thereby rotating the solenoid lever 31 counterclockwise around the shaft 1c. This rotation of the solenoid lever 31 continues until the iron core 33a is absorbed on the permanent magnet contained in the solenoid 33. As a result of the counterclockwise rotation of the solenoid lever 31, the selection lever 36 also rotates in the same direction around the shaft 1c to move the pinch roller operation lever 30 in the direction of the arrow D by means of the pin 36c. This condition is shown in FIGS. 5 and 14.

Figure 5:
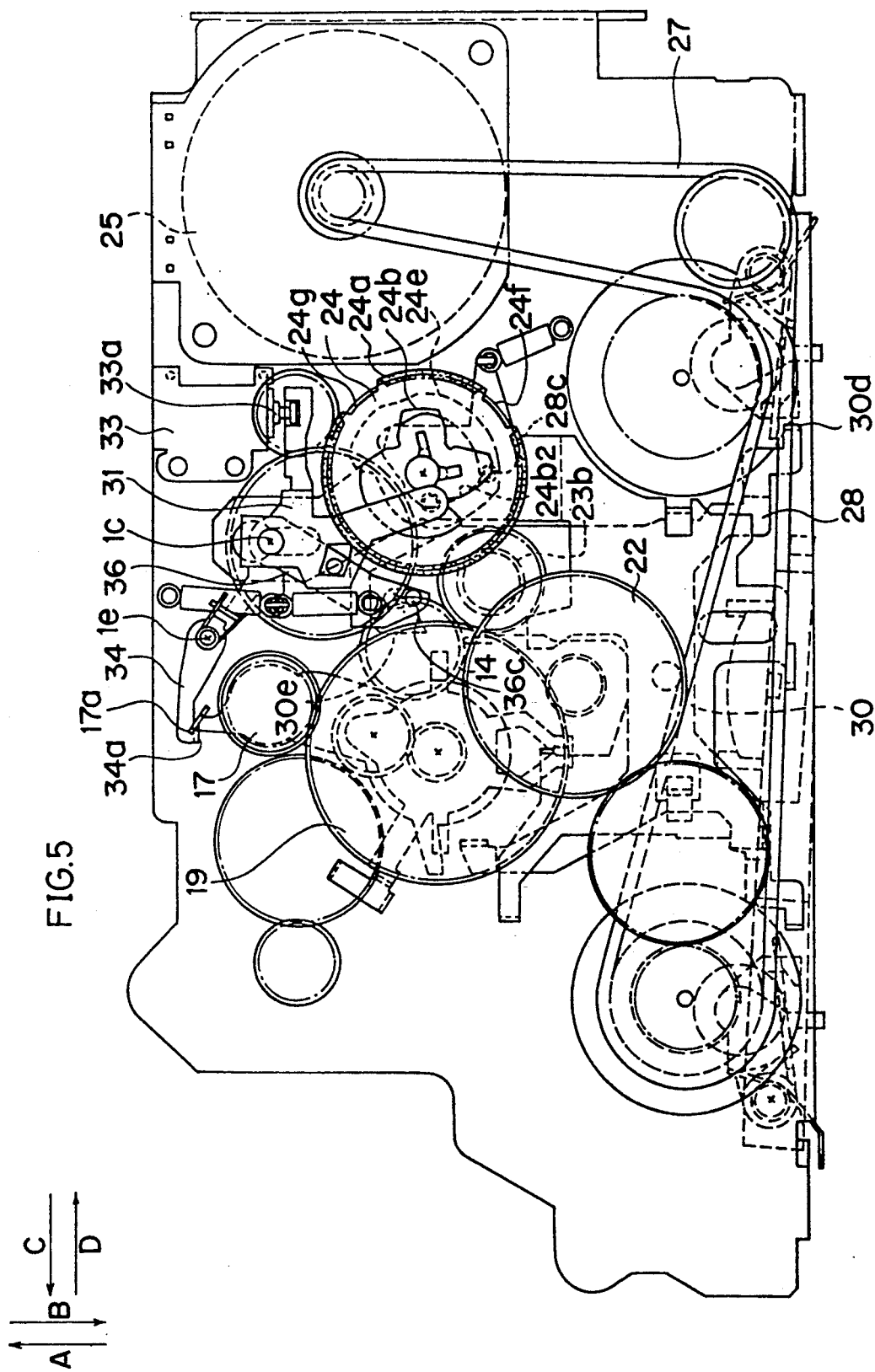
FIG. 5 is a plan view of the tape running mechanism before change to the FWD play mode or a reverse (REV) play mode.
Figure 14:
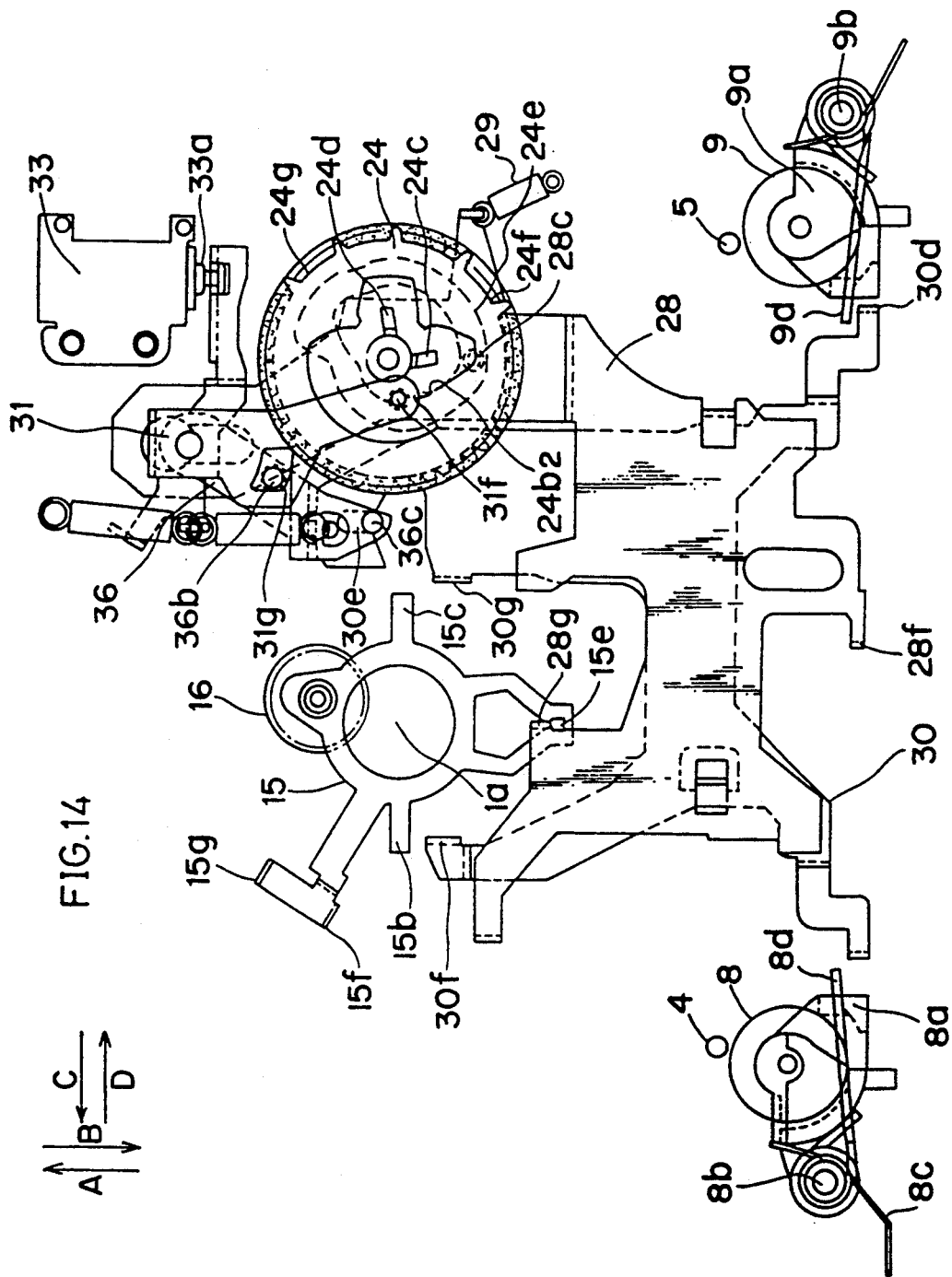
FIG. 14 is a plan view of the tape running mechanism before change to the FWD play mode or the REV play mode.

In the condition shown in FIGS. 5 and 14, determination is made as to whether FWD play or REV play is to be selected dependent on whether the solenoid 33 is to be conducted with the single pulse. The timing of the determination is selected corresponding to the elapsed time after the conduction of the solenoid 33, namely, the time T2 in step S3. However, the time required for the PAD cam 24 to attain the position shown in FIG. 5 (and FIG. 14) from the position shown in FIG. 13 (and FIG. 4) depends on the rotation speed of the motor 25, which further depends on the voltage applied to the motor 25 and, therefore, correction is made with respect to the time T2 in step S5. Particularly, in the case of a tape player using a battery as a power supply, this correction is indispensable since the voltage lowers while the player is being used. Thus, the correction for the time T2 in step S5 is performed according to the flow shown in FIG. 23.

The control circuit 41 detects, in step S4, a voltage V1 supplied from the motor voltage detector 49 to the motor 25 immediately after the conduction of the solenoid 33 with the single pulse, reads out a reference voltage V2 stored in the memory, and subtracts the supplied voltage V1 from the reference voltage V2 to obtain a value $\Delta V$. Then, the control circuit 41 multiplies the value $\Delta V$ by a constant h to obtain a time deficiency t1 and the time deficiency t1 is added to the reference time t so that the value obtained by the addition is used as the above-mentioned time T2.

The reference voltage V2 is preset higher than the voltage supplied to the motor 25, and the reference time V2 is set to time required for the PAD cam 24 to reach the position in FIG. 14 from the position in FIG. 13 when the above-mentioned reference voltage V2 is supplied to the motor 25. The rotation speed and the supplied voltage of the motor 25 are in a proportional relation. If the supplied voltage V1 is lower than the reference voltage V2, the PAD cam 24 could not reach the position shown in FIGS. 5 and 14 from the position shown in FIGS. 4 and 13 in the above-mentioned reference time t and consequently a value necessary for obtaining the time deficiency t1 based on the above-mentioned difference $\Delta V$ of voltages is calculated in advance as the constant h.

Thus, the control circuit 41 makes correction for the time T2 in step S5 and when it is determined in step S6 that the time T2 has passed, the control circuit 41 reads the FWD play or the REV play as the previous play mode stored in the memory in step S7.

If the previous play mode is the FWD play mode, a signal is supplied to the solenoid drive circuit 51 in step S8, so that the solenoid 33 is conducted with a single pulse.

More specifically stated, according to the present embodiment, the cassette tape player includes: the PAD cam 24 rotated by the motor 25 as the drive source; the solenoid lever (lever member) 31 which is operated by the cam 24 to switch modes and is capable of changing the positional relation with the PAD cam 24 in a mode selection position in the rotation course of the PAD cam 24; the solenoid (drive means) 33 which moves the solenoid lever 31 to change the positional relation between the PAD cam 24 and the solenoid lever 31; and the motor voltage detector 49 which detects a change in the rotation speed of the motor 24 by a change in the supplied voltage. In addition, the control circuit 41 includes: selection position detecting means for making correction for the preset time based on the detected by the motor voltage detector 49 and providing a mode selection position detecting signal when the elapsed time after the start of operation of the PAD cam 24 attains the time obtained by the correction; and control means for operating the solenoid 33 when the mode selection detecting signal is inputted from the selection position detecting means and a signal (FWD play signal) based on a play mode switching instruction is inputted.

Referring to FIG. 14, when the solenoid 33 is conducted with the single pulse, the solenoid lever 31 rotates clockwise in the same manner as described above to cause the pin 31f to contact and slide over a cam surface 24b3 of the cam member 24 which continues rotating counterclockwise. As a result of the rotation of the solenoid lever 31, the selection lever 36 is also rotated clockwise and the pin 36c pushes a wall surface of the guide hole 36e of the pinch roller operation lever 30, causing the operation lever 30 to move in the direction of the arrow C. The fast forwarding engaging lever 34 also receives the counterclockwise rotation force around the shaft 1e and is kept engaged with the fast forwarding lever 17.

The cam member 24e of the PAD cam 24 rotating counterclockwise pushes the pin 28c of the sub operation lever 28 to move the sub operation lever 28 in the direction of the arrow A in opposition to the spring 29. Consequently, the bending portion 28g comes out from the slit 15e of the play gear lever 15 and accordingly the pinch roller operation lever 30 also moves in the same direction to cause the pin 36c of the selection lever 36 to come out from the guide hole 30e.

After the pin 36c has been moved out from the guide hole 30e, the PAD cam 24 starts to rotate the solenoid lever 31 counterclockwise through the pin 31f pressed against a cam surface 24b4 of the cam member 24b. At this time, since the pin 36c is outside the guide hole 30e, the selection lever 36 rotates counterclockwise according to the movement of the solenoid lever 31, without moving the pinch roller operation lever 30 in the direction of the arrow D. Thus, the pinch roller operation lever 30 is in the state moved in the direction of the arrow C. Then, by the counterclockwise rotation of the solenoid lever 31, the permanent magnet contained in the solenoid 33 absorbs the iron core 33a. Although the clockwise rotation force is applied to the fast forwarding engaging lever 34, the fast forwarding engaging lever 34 does not rotate clockwise since it is engaged with the fast forwarding lever 17, and the above-mentioned rotation force is absorbed by the torsion spring 35.

In the meantime, the sub operation lever 28 and the pinch roller operation lever 30 continue to move in the direction of the arrow A and the sub operation lever 28 presses the contact portion 11a (as shown in FIG. 1) by means of its pressing portion 28f to rotate the sub chassis 11 counterclockwise around the shaft 8b, whereby the magnetic head 10 advances in the direction of the arrow A and contacts the tape surface, not shown. The pinch roller operation lever 30 presses the contact portion c by means of the bending portion 30g to rotate the play gear lever 15 counterclockwise around the shaft 1a and to engage the play gear 16 with the FWD idler gear 12. At the same time, the pinch roller operation lever 30 presses the spring 8d by means of the pinch roller operating portion 30c to rotate the pinch lever a counterclockwise around the shaft 8b, so that the FWD pinch roller 8 is pressed against the FWD capstan shaft with the magnetic tape being put therebetween.

At this time, the play mode detection switch 47 is turned on and the FWD/REV detection switch 48 is turned to the FWD play side by means of the switch operating portion 15f of the play gear lever 15. Thus, the control circuit 41 stores the FWD play.

Figure 6:
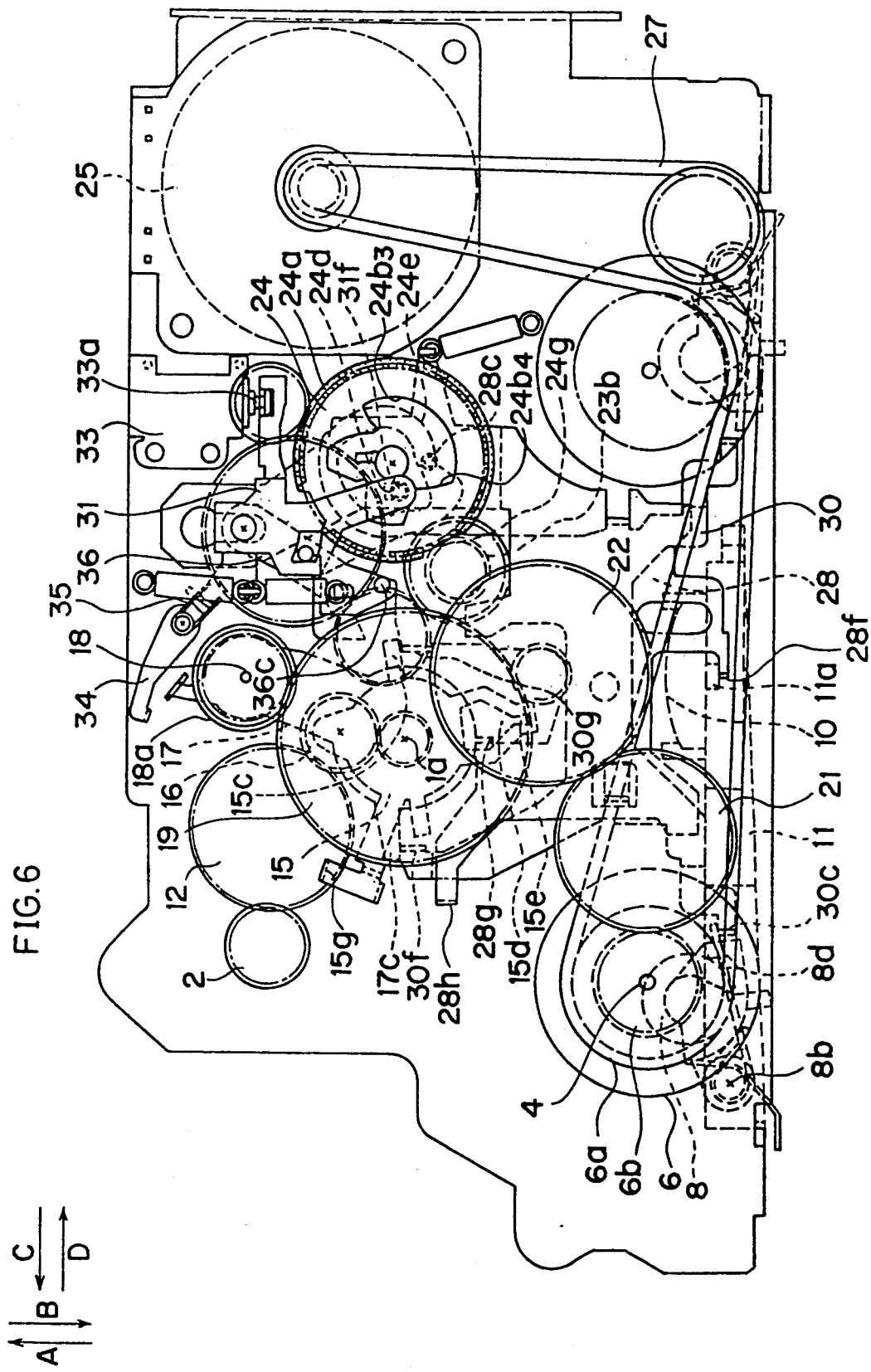
FIG. 6 is a plan view of the tape running mechanism in the FWD play mode.
Figure 16:
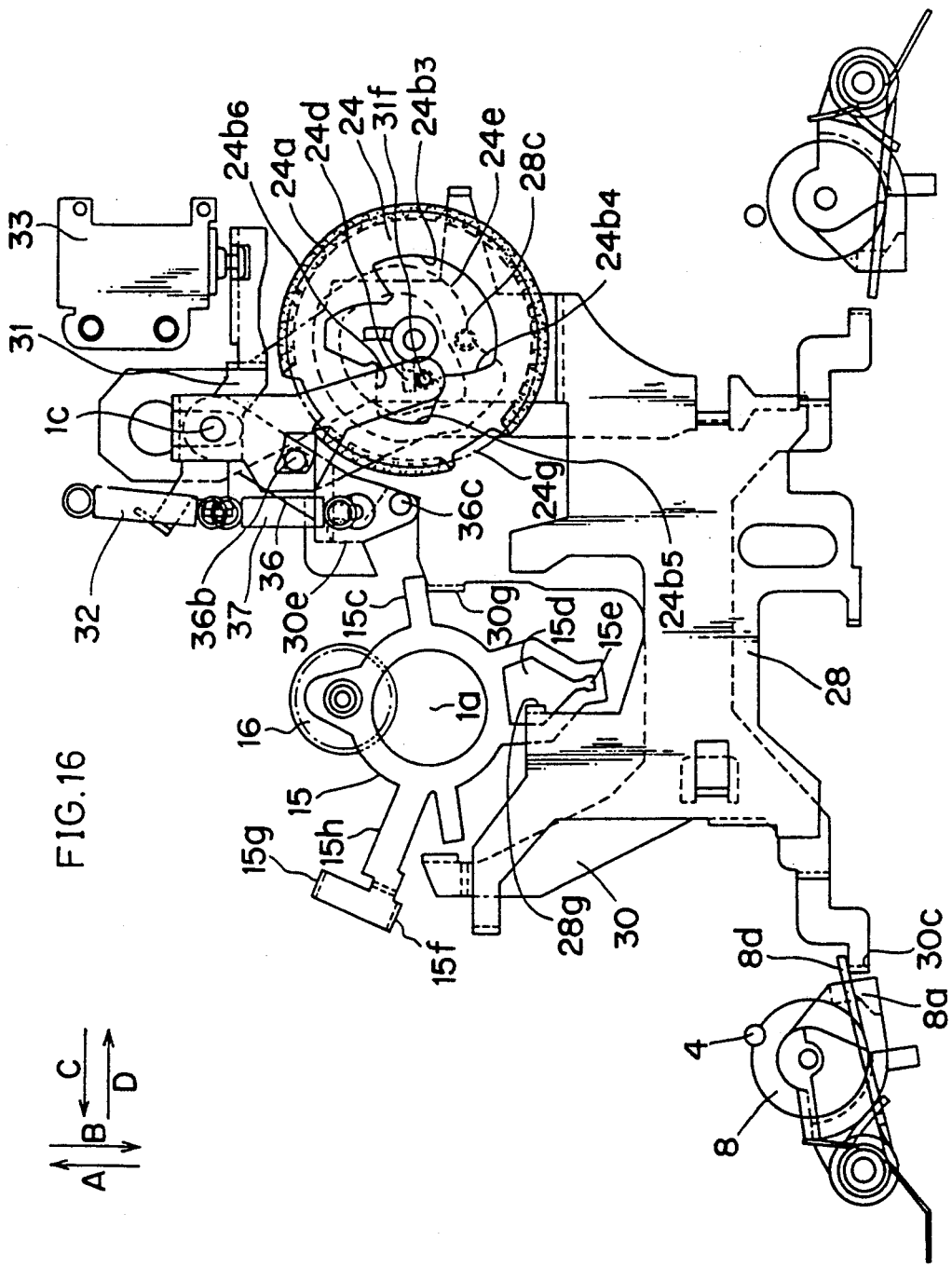
FIG. 16 is a plan view of the tape running mechanism in the FWD play mode.

By the above-described operation, the tape running mechanism is set in the FWD play mode and is in the condition as shown in FIGS. 6 and 16. When the play gear 16 engages with the FWD idler gear 12, the lock portion 24d of the PAD cam 24 engages with the pin 31 of the solenoid lever 31 and the counterclockwise rotation of the PAD cam 24 is stopped with the non-toothed portion 24g being opposed to the small-diameter gear 23b of the cam drive gear 23.

In this state, the clockwise rotation of the motor 25 is transmitted to the take-up gear 2 through the belt 27, gear 6b, drive transmission gear 21, drive conversion gear 22, slip gear 19, play gear 16 and FWD idler gear 12, and the magnetic tape of the tape cassette runs in the forward direction by rotation of the FWD capstan 4 pressed by the FWD pinch roller 8. The fast forwarding gear lever 17 rotates clockwise with the contact portion 17c being pressed by the bending portion 30f of the pinch roller operation lever 30, causing disengagement from the fast forwarding engaging lever 34. The counterclockwise rotation of the fast forwarding gear lever 17 around the shaft 1a is stopped by the bending portion 30f of the pinch roller operation lever 30. In consequence, the fast forwarding gear 18a does not engage with the FWD idler gear 12 and rotates at the prescribed position around the shaft 18.

The control circuit 41 operates the reproduction circuit in step S9 so that music information recorded in the magnetic tape is read and reproduced by the magnetic head 10. Thus, the user can enjoy listening to the reproduced sound by means of earphones or headphones.

By the above-described operation, the FWD play, namely, the FWD reproduction is performed.

First stop mode→REV play mode:

The control circuit 41 performs the same control operation as in the above-described steps S1 to S7 and the tape running mechanism is also operated in the same manner.

When it is determined in step S7 that the previous play mode is the REV mode, the mode switches to the REV mode. The switching to the REV mode is effected by continuing the counterclockwise rotation of the PAD cam 24 without conducting the solenoid 33 in the position shown in FIGS. 5 and 14, as in the FWD mode.

When the PAD cam 24 rotates counterclockwise from the position shown in FIGS. 5 and 14, the cam member 24b does not apply any force to the pin 31f, and the solenoid lever 31, the selection lever 36 and the fast forwarding engaging lever 34 do not operate. Thus, the pinch roller operation lever 30 is kept in the state moved in the direction of the arrow D.

The cam member 24e of the PAD cam 24 pushes the pin 28c of the sub operation lever 28 to move the sub operation lever 28 in the direction of the arrow A together with the pinch roller operation lever 30, whereby the bending portion 28g and the pin 36c of the selection lever 36 are moved away from the slit 35e and the guide hole 30e, respectively. In addition, according to the movement of the lever 28 in the direction of the arrow A, the pressing portion 28f rotates the sub chassis 11 counterclockwise around the shaft 8b by means of the contact portion 11a (as shown in FIG. 1), causing the magnetic head 10 to be in contact with the tape surface. The pinch roller operating portion 30d rotates the pinch lever 9a around the shaft 9b by means of the operation spring 9d, whereby the REV pinch lever 9 is pressed against the REV capstan shaft 5 with the tape being put therebetween. Further, the bending portion 30f contacts the contact portion 15b of the play gear lever 15 to rotate the play gear lever 15 clockwise around the shaft 1a, whereby the play gear 16 engages with the REV idler coupling gear 14 (as shown in FIG. 1).

Figure 7:
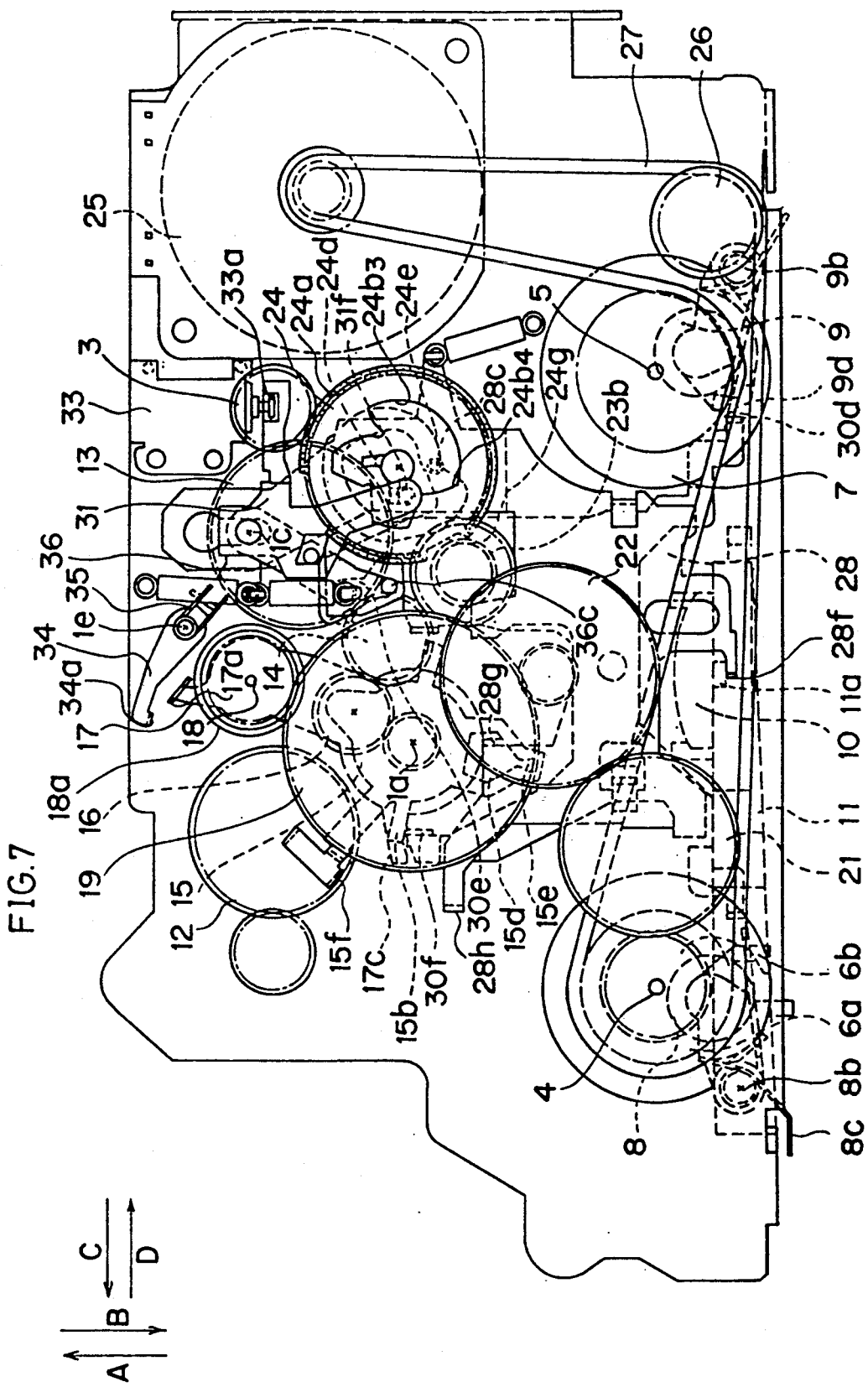
FIG. 7 is a plan view of the tape running mechanism in the REV play mode.
Figure 15:
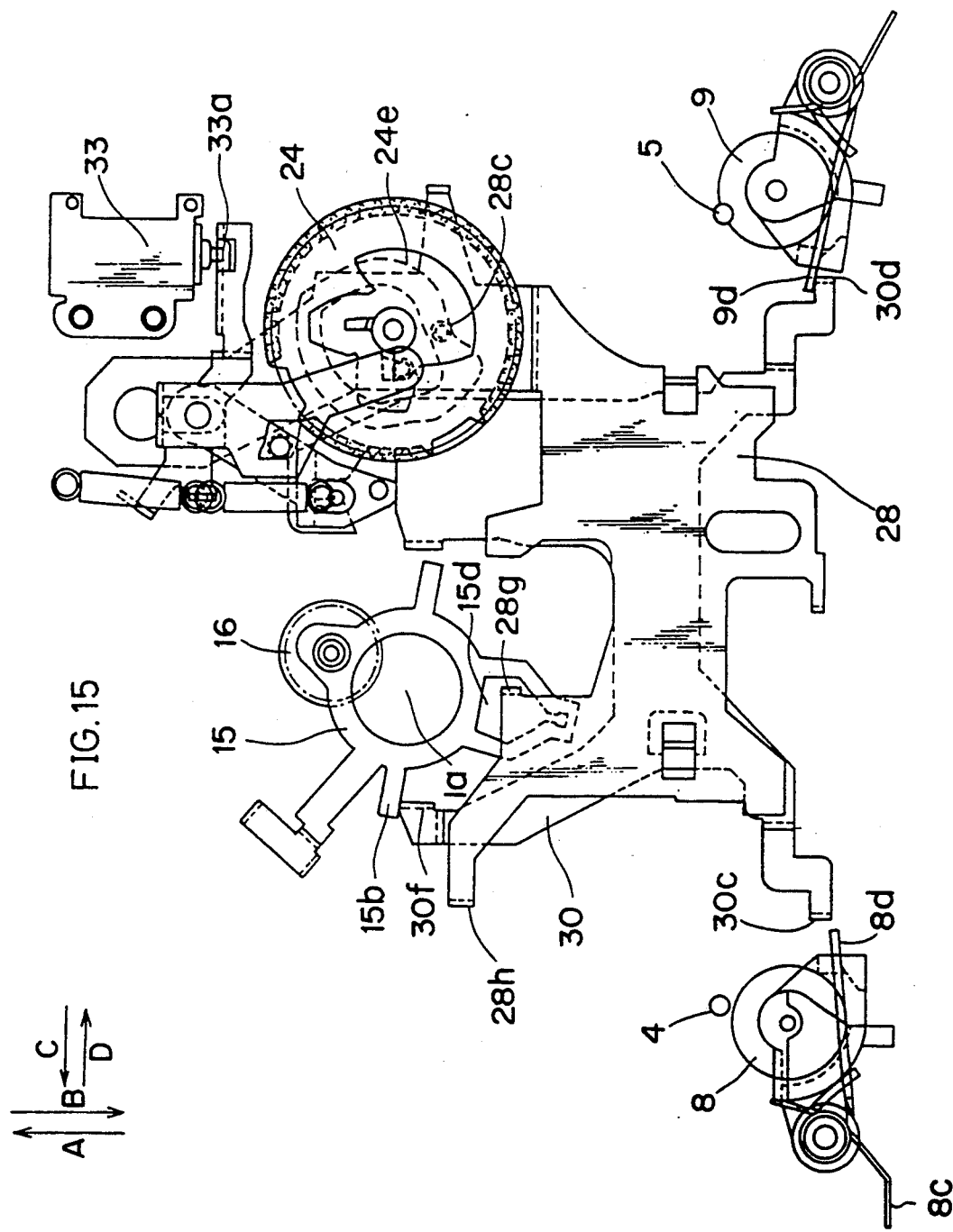
FIG. 15 is a plan view of the tape running mechanism in the REV play mode.

Then, the PAD cam stops with the pin 31f being engaged with the lock portion 24d, and the non-toothed portion 24g being opposite to the small-diameter gear 23b of the cam drive gear 23. Thus, the REV play mode shown in FIGS. 7 and 15 is set. At this time, the play mode detection switch 47 is on as in the case of the FWD mode, and the FWD/REV detection switch 48 is set to the REV play side by means of the switch operating portion 15f of the play gear lever 15. Thus, the control circuit 41 stores the REV play in the memory.

By the above-described operation, the tape running mechanism is switched to the REV play mode and is in the state as shown in FIGS. 7 and 15. When the play gear 16 engages with the REV idler coupling gear 14, the counterclockwise rotation of the PAD cam 24 is stopped by the engagement of the pin 31f of the solenoid lever 31 with the lock portion 24d and the non-toothed portion 24g is opposed to the small-diameter gear 23b of the cam drive gear 23.

In this state, the clockwise rotation of the motor 25 is transmitted to the feed gear 3 through the belt 27, gear 6b, drive transmission gear 21, drive conversion gear 22, slip gear 19, play gear 16, REV idler coupling gear 14 and REV idler gear 13, and the magnetic tape of the tape cassette runs in the reverse direction by the rotation of the REV capstan shaft 5 pressed by the REV pinch roller 9. The fast forwarding gear lever 17 is prevented from rotating counterclockwise for the same reason as in the play mode, and the fast forwarding gear 18a rotates at the prescribed position around the shaft 18 without engaging with the FWD idler gear 12.

The control circuit 41 operates the reproduction circuit in step S9 so that the music information recorded in the magnetic tape is read and reproduced by means of the magnetic head 10. Thus, the user can enjoy listening to the reproduced sound by means of earphones or headphones.

By the above-described operation, the REV play, namely, the REV reproduction is performed.

FWD play mode→first stop mode:

In the FWD play mode, when the stop button is operated and the stop switch 45 is turned on, the control circuit 41 determines the turn-on of the stop switch 45 and reads a corresponding control program from the memory, and it performs control operation as shown in the flow chart of FIG. 22.

When the control circuit 41 determines the turn-on of the stop switch 45 in step S10 in FIG. 21, it determines by means of the play mode detection switch 47 in step S11 of FIG. 22 whether the mode presently selected is the play mode or not.

If the play mode detection switch 47 is turned on, and the selection of the play mode is determined, the solenoid 33 is conducted with a single pulse and counting for time T3 is started.

Referring to FIG. 6, the solenoid 33 generates instantaneously a magnetic force as a result of the conduction with the single pulse. Consequently, as described previously, the solenoid lever 31 rotates clockwise around the shaft 1c to disengage the pin 31f from the lock portion 24d of the PAD cam 24 and to rotate the fast forwarding engaging lever 34 counterclockwise around the shaft 1e by means of the torsion spring 35. By the counterclockwise rotation of the fast forwarding engaging lever 34, the fast forwarding engaging lever 34 returns to the initial position enabling engagement with the fast forwarding gear lever 17. The selection lever 36 also rotates clockwise together with the solenoid lever 31, causing the pin 36c to be opposite to the guide hole 30e of the pinch roller operation lever 30.

The pin 31f comes out of the lock portion 24d and presses against a cam surface 24b5 of the cam member 24b the gear 24a with the small-diameter gear 23b of the cam drive gear 23. The PAD cam 24 rotates by the clockwise rotation force of the cam drive gear 23 and the pin 31f slides on a cam surface 24b6 of the cam member 24b.

On the other hand, by the counterclockwise rotation of the PAD cam 24, the cam member 24e pushes the pin 28c to move the sub operation lever 28 in the direction of the arrow B. As a result of the movement of the sub operation lever 28, the sub chassis 11 rotates clockwise around the shaft 8b to separate the magnetic head 10 from the magnetic tape. At the same time, the bending portion 28g contacts an oblique edge of the hole 15d of the play gear lever 15 to rotate the lever 15 clockwise around the shaft 1a, causing the play gear 16 to return to the neutral position. The stopped state of the fast forwarding gear lever 17 by means of the bending portion 30f is canceled but since the left portion 17a engages with the engaging portion 34a of the fast forwarding engaging lever 34, the fast forwarding gear 18a is maintained in the neutral position.

Since the pinch roller operation lever 30 also moves in the direction of the arrow B, the pinch roller operating portion 30c is separated from the spring 8d and the FWD pinch roller 8 is separated from the FWD capstan 4 by the actuating force of the spring 8c, with the guide hole 30e being opposite to the pin 36c.

Referring to FIGS. 3 and 12, when the PAD cam 24 further rotates, the pin 31f reaches a cam surface 24b7 of the cam member 24b and the solenoid lever 31 is pushed by the cam surface 24b7 and starts to rotate counterclockwise. Thus, the iron core 33a is finally absorbed by the permanent magnet contained in the solenoid 33 and the pin 31f engages with the lock portion 24c, with the non-toothed portion 24f being opposite to the small-diameter gear 23b of the cam driver gear 23. In consequence, the PAD cam 24 is in the stop state. At this time, the selection lever 36 also rotates together with the solenoid lever 31 to move the pinch roller operation lever 30 in the direction of the arrow D by means of the pin 36c. Thus, the fast stop mode is set as shown in FIGS. 3 and 12.

Although the FWD/REV detection switch 48 is returned to the neutral position, the control circuit 41 stores the FWD mode as the present play mode.

The above-mentioned time T3 will be described hereinafter. The time T3 is set based on the time until the tape running mechanism switches to the state shown in FIGS. 3 and 12 after the conduction of the solenoid 33 in step S12, and this time T3 is used as a value for controlling the timing for turning off the motor 25. Consequently, correction processing is performed with respect to the time T3 based on the voltage applied to the motor 25 in the same manner as described previously in connection with the time T2, whereby the motor 25 can be turned off reliably in the state shown in FIGS. 3 and 12. Such correction processing is performed in step S13. When the control circuit 41 determines in step S14 that the time T3 has passed, it supplies a signal to the motor drive circuit in step S15 to stop the motor 25.

By the above-described operation, the mode switches from the FWD play mode to the first stop mode.

REV play mode→first stop mode:

In the REV play mode, when the stop button is operated as the stop switch 45 is turned on, the control circuit 41 determines the turn-on of the switch 45 and controls the respective components according to a prescribed control program. Since the control operation is the same as in the case of the above-described case of "FWD play mode→first stop mode", the description thereof is not repeated.

In addition, the description of the mechanical operation is not repeated since the operation of the solenoid 33, PAD cam 24, solenoid lever 31 etc. is the same as in the above-described case of "÷FWD play mode→first stop mode" except for a few differences as described below. For example, the rotating direction of the play gear lever 15 in return is different, the REV pinch roller is separated from the capstan shaft, and the pinch roller operation lever 30 does not move in the direction of the arrow D. Finally, the state shown in FIGS. 3 and 12 is set.

First stop mode→FF mode:

When the FF button is depressed and the FF switch 43 is turned on, the control circuit 41 determines the turn-on of the FF switch 43 and stores the setting of the FF mode in the memory. At the same time, the control circuit 41 reads a control program of the FF mode from the memory and performs control operation as shown in the flow chart of FIG. 20.

When the control circuit 41 determines the turn-on of the FF switch 43 in step S1, the control circuit 41 supplies a signal to the motor drive circuit 52 in step S16 to rotate the motor 25 counterclockwise and to start counting for the time T1.

The control in step S16 is the same as that in step S2 and the operation of the tape running mechanism in this case is also the same as described previously. Accordingly, when the elapse of the time T1 is determined in step S17, the fast forwarding gear lever 17 rotates clockwise around the shaft 1a as shown in FIG. 3, and the fast forwarding engaging lever 34 cancels the engagement between the engaging portion 34a and the left portion 17a and is rotated clockwise around the shaft 1e by means of the torsion spring 35.

In the subsequent step S18, the control circuit 41 supplies a signal to the motor drive circuit 52, so that the motor 25 rotates reversely, namely, clockwise. Then, the clockwise rotation force of the motor 25 is transmitted to the slip gear 19 through the motor pulley 25a, belt 27, pulley 6a, gear 6b, drive transmission gear 21 and drive conversion gear 22, and by the counterclockwise rotation of the slip gear 19, the fast forwarding gear lever 17 which engages the fast forwarding gear 18b with the large-diameter gear 19a rotates counterclockwise around the shaft 1a. Thus, the fast forwarding gear 18a on the same shaft as for the fast forwarding gear 18b is engaged with the FWD idler gear 12. After the engagement, the fast forwarding gear 18a rotates clockwise around the shaft 18 and the rotation force thereof is transmitted to the take-up gear 2 through the FWD idler gear 12.

This state is shown in FIG. 1, in which the take-up reel support rotates in the take-up direction at high speed and the magnetic tape of the tape cassette runs in the forward direction at high speed.

FF mode→second stop mode:

In the FF mode, when the stop switch 45 is turned on by depressing the stop button, the control circuit 41 stores the setting of the stop mode by the turn-on of the stop switch 45 in the memory and reads a corresponding program from the memory to perform control operation.

After the control circuit 41 determines the turn-on of the stop switch 45 in step S20 in FIG. 20, the control circuit 41 determines in step S11 in FIG. 22 whether the present mode is the play mode or not. In this case, the sub operation lever 28 is kept away in the direction of the arrow B and the play mode detection switch 47 is off. Thus, the control circuit 41 determines that the mode is not the play mode, and supplies immediately a signal to the motor drive circuit 52 in step S15 to stop the motor 25.

Thus, in the second stop mode, the only difference from the FF mode is that the motor 25 stops. There is no difference from the state of FIG. 1 as to the respective components of the tape running mechanism. Thus, the state of FIG. 1 represents the FF mode and also the second stop mode.

First stop mode→REW mode:

When the REW switch 44 is turned on by depressing the REW button, the control circuit 41 determines the turn-on of the REW switch 44 and stores the setting of the REW mode in the memory. At the same time, the control circuit 41 reads out a control program of the REW mode from the memory and performs control operation as shown in the flow chart of FIG. 20.

After the determination of the turn-on of the REW switch 44 in step S1, the control circuit 41 supplies a signal to the motor drive circuit 52 in step S21 to rotate the motor counterclockwise.

Then, the counterclockwise rotation force of the motor 25 is transmitted to the slip gear 19 through the motor pulley 25a, gear 6b, drive transmission gear 21 and drive conversion gear 22, and by the clockwise rotation of the slip gear 19, the fast forwarding gear lever 17 rotates clockwise around the shaft 1a from the state shown in FIG. 3 to engage the fast forwarding gear 18a with the REW idler gear 13. As a result, the rotation of the slip gear 19 is transmitted to the feed gear 3 through the fast forwarding gears 18b, 18a, and REW idler gear 13.

This state is shown in FIG. 2, in which the feed reel support rotates counterclockwise, namely, in the tape take-up direction at high speed and the magnetic tape of the tape cassette runs at high speed in the rewinding direction.

REW mode→third stop mode:

When the stop switch 45 is turned on by depressing the stop button in the REW mode, the control circuit 41 stores the setting of the stop mode by the turn-on of the stop switch 45 in the memory and reads out a corresponding program from the memory to perform control operation.

After the determination of the turn-on of the stop switch 45 in step S23 in FIG. 20, the control circuit 44 determines in step S11 in FIG. 22 whether the present mode is the play mode or not. In this case, the sub operation lever 28 is kept away in the direction of the arrow B and the play mode detection switch 47 is off. Thus, the control circuit 41 determines that the present mode is not the play mode and supplies immediately a signal to the motor drive circuit 52 in step S15 to stop the motor 25.

Therefore, in the third stop mode, the difference from the REW mode is that the motor 25 stops, and the state of the respective components of the tape running mechanism is the same as in FIG. 2. Thus, the state of FIG. 2 represents the REW mode and the third stop mode.

Play mode→FF mode:

When the FF button is depressed and the FF switch 43 is turned on in the FWD or REV play mode, the control circuit 41 stores in the memory the setting of the FF mode by the turn-on of the FF switch 43 and reads out a corresponding program from the memory to perform control operation.

When the control circuit 41 determines the turn-on of the FF switch 43 in step S10 where the FWD or REV play mode is currently set, the control circuit 41 performs control at first to return the mode to the first stop mode. More specifically, as shown in FIG. 21, the same control operation as in steps S12 to S14 in FIG. 22 described above in detail in the case of "FWD play mode→first stop mode". Needless to say, the operation of the tape running mechanism at this time is the same as described above.

Consequently, when the control circuit 41 determines the elapse of the time T3, the state of the respective components of the tape running mechanism is switched to the state shown in FIGS. 3 and 12. After the determination of the elapse of the time T3, the control circuit 41 performs the same control operation as in steps S16 to S18 in FIG. 20 described previously in the case of "first stop mode→FF mode". By the control operation, the tape running mechanism is switched to the FF mode shown in FIG. 1, and the magnetic tape of the tape cassette runs in the FF direction, at high speed.

By the above-described operation, the mode switches from the FWD or REV play mode to the FF mode.

Play mode→REW mode:

When the REW switch 44 is turned on by depressing the REW button in the FWD or REV play mode, the control circuit 41 stores in the memory the setting of the REW mode by the turn-on of the REW switch 44 and reads out a corresponding program from the memory to perform control operation.

After the control circuit 41 determines the turn-on of the REW switch 44 in step S10 where the FWD or REV play mode is currently set, the control circuit 41 performs control at first to return the mode to the first stop mode. More specifically, as shown in FIG. 21, the control circuit 41 performs the same control operation as in steps S12 to S14 in FIG. 22 described above in detail in the case of "FWD play mode→first stop mode". The operation of the tape running mechanism during this control is also the same.

Consequently, when the control circuit 41 determines the elapse of the time T3, the state of the respective components of the tape running mechanism is changed to the state shown in FIGS. 3 and 12. After the determination of the elapse of the time T3, the control circuit 41 performs the same control operation as in step S21 in FIG. 20 described previously in the case of "first stop mode→REW mode". By the control operation, the tape running mechanism is switched to the REW mode shown in FIG. 2, in which the magnetic tape of the tape cassette runs at high speed in the rewinding direction.

By the above-described operation, the mode switches from the FWD or REV play mode to the REW mode.

FF or REW mode→play mode:

When the play switch 42 is turned on by depressing the play button in the FF or REW mode, the control circuit 41 stores in the memory the setting of the play mode by the turn-on of the play switch 42 and reads out a corresponding program from the memory to perform control operation.

When the control circuit 41 determines the turn-on of the play switch 42 in step S20 or S23 where the FF or REW mode is currently set, it performs the same control operation as in steps S2 to S9 in FIG. 20 described above in detail in the case of "first stop mode→FWD play mode". During this control operation, the operation of the tape running mechanism is the same as described above, and then the mode switches to the play mode. Whether the play mode to be set is the FWD play mode or the REV play mode is determined by the previous play mode stored in the memory of the control circuit 41.

When the motor 25 is rotated counterclockwise in step S2, the fast forwarding gear 18a engages with the REV idler gear 13 as shown in FIG. 2 at the time of switching from the REW mode to the play mode and consequently, the feed reel support is rotated in the rewinding direction even after the depression of the play button. However, since the counterclockwise rotation of the motor 25 is limited only for the time T1 which is very short as described above and therefore there is no practical problem.

FF mode→REW mode:

When the REW switch 44 is turned on by depressing the REW button in the FF mode, the control circuit 41 stores in the memory the setting of the REW mode by the turn-on of the REW switch 44 and reads out a corresponding program from the memory to perform control operation.

When the control circuit 41 determines the turn-on of the REW switch 44 in step S20 where the FF mode is currently set, the rotating direction of the motor 25 is switched from the clockwise direction to the counterclockwise direction as shown in step S21. Consequently, the rotating direction of the slip gear 19 also changes from the counterclockwise direction to the clockwise direction and the fast forwarding gear lever 17 rotates clockwise around the shaft 1a from the position shown in FIG. 1. The fast forwarding gear 18a which has been engaged with the FWD idler gear 12 is separated from the FWD idler gear 12 and is engaged with the REV idler gear 13 and the state as shown in FIG. 2 is set. As a result, the rotation of the slip gear 19 is transmitted to the feed gear 3 through the fast forwarding gears 18b, 18a and REV idler gear 13, and the feed reel support rotates in the rewinding direction, whereby the REW mode is applied.

REW mode→FF mode:

When the FF switch 43 is turned on by depressing the FF button in the REW mode, the control circuit 41 stores in the memory the setting of the FF mode by the turn-on of FF switch 43 and reads out a corresponding program from the memory to perform control operation.

When the control circuit 41 determines the turn-on of the FF switch 43 in step S23 where the REW mode is currently set, the control circuit 41 switches the rotating direction of the motor 25 from the counterclockwise direction to the clockwise direction as shown in step S18. Then, the rotating direction of the slip gear 19 also changes from the clockwise direction to the counterclockwise direction and the fast forwarding gear lever 17 rotates counterclockwise around the shaft 1a from the position shown in FIG. 2. The fast forwarding gear 18a which has been engaged with the REV idler gear 13 is separated from the REV idler gear 13 and is engaged with the FWD idler gear 12 and thus the state shown in FIG. 1 is set. As a result, the rotation of the slip gear 19 is transmitted to the take-up gear 2 through the fast forwarding gears 18b, 18a and FWD idler gear 12, and the take-up reel support rotates in the forward direction. Thus, operation in the FF mode is executed.

FWD play mode→REV play mode:

When the play switch 42 is turned on by depressing the play button during the operation in one of the play modes, for example, the FWD play mode, the control circuit 41 stores in the memory the setting of the play direction switching mode by the turn-on of the play switch 42 and reads out a corresponding program from the memory to perform control operation.

After the determination of the turn-on of the play switch 42 in step S10 where the FWD play mode is currently set, the control circuit 41 performs control at first to return the mode to the first stop mode. More specifically, it performs the same control operation as in steps S12 to S14 in FIG. 22 described in detail in the case of "FWD play mode→first stop mode", as shown in FIG. 21. The operation of the tape running mechanism during this control is also the same as described above Thus, when the control circuit 41 determines the elapse of the time T3, the state of the respective components of the tape running mechanism is changed to the state shown in FIGS. 3 and 12. After the determination of the elapse of the time T3, the control circuit 41 performs the same control operation as in steps S2 to S6 in FIG. 20 described in connection with the case of "first stop mode→FWD play mode". By this control operation, the tape running mechanism is switched to the FWD/REV selection position shown in FIGS. 5 and 14.

In the stop mode, when a play mode is set, the previous play mode stored in the memory is read in step S7 so that the same play mode is set. However, at the time of setting the play direction switching mode, the control program is executed so that the present play mode is different from the previous play mode.

Thus, when the control circuit 41 determines the elapse of the time T2, it reads out the previous play mode (the FWD play mode in this case) and makes determination based on the previous play mode thus read, so that the REV play mode is set.

Thus, the tape running mechanism operates to be switched from the FWD/REV selection position shown in FIGS. 5 and 14 to the REV play mode shown in FIGS. 7 and as described in detail in the case of "first stop mode→REV play mode", whereby REV play is performed.

By the above-described operation, the mode switches from the FWD play mode to the REV play mode.

REV play mode→FWD play mode:

When the play switch 42 is turned on by depressing the play button in the REV play mode, the control circuit 41 stores in the memory the setting of the play direction switching mode by the turn-on of the play switch 42 and reads out a corresponding program from the memory to perform control operation.

When the control circuit 41 determines the turn-on of the play switch 42 in step S10 where the REV play mode is set, the control circuit 41 performs the same control operation as described above in the case of "FWD play mode→REV play mode" and after the mode of the tape running mechanism is temporarily switched to the first stop mode shown in FIGS. 3 and 12, the position of the tape running mechanism is changed to the FWD/REW selection position shown in FIGS. 5 and 14.

Next, when the control circuit 41 determines the elapse of the time T2, it reads out the previous play mode (the REV play mode in this case) and makes determination based on this mode. As a result, the control circuit 41 sets the FWD play mode opposite to the REV play mode and performs control operation shown in step S8 in FIG. 20. The tape running mechanism operates to be switched to the FWD play mode shown in FIGS. 6 and 14 from the FWD/REV selection position as described in detail in the case of "first stop mode→FWD play mode", so that FWD play is performed.

By the above-described operation, the mode switches from the REV play mode to the FWD play mode.

Tape end detection:

Tape end detection in a one-cycle mode, an endless mode or the like (to be described afterwards) will be briefly described.

A rotation detector 50 used for the tape end detection is a well-known detector including a black-and-white striped pattern on the surface of the FWD idler gear 12 rotating in either of the FWD, REV play modes, a light emitting portion emitting light to the surface of the idler gear 12, and a light receiving portion receiving light reflected on the white stripes. While the FWD idler gear 12 is rotating, reflection of light on the white stripes and absorption of light on the black stripes are repeated and the light receiving portion generates a pulse each time it receives the reflected light. When the light receiving portion does not periodically generate a pulse, the control circuit 41 determines that the rotation is stopped, that is, the magnetic tape stops running and attains a tape end.

The rotation force of the motor 25 is not transmitted to the FWD idler gear 12 in the REV play mode but when the magnetic tape is drawn from take-up reel of the tape cassette, the take-up reel, take-up reel support engaged therewith, and take-up gear 2 rotate. The FWD idler gear 12 engaged with the gear 2 also rotates.

The tape end detection is also effected in the FF mode and the REW mode, and by the detection of a tape end, the FF mode and the REW mode change to the second stop mode and the third stop mode, respectively.

One-cycle mode:

The one-cycle mode is a mode in which the play mode is terminated by the tape end detection in REV play, while the endless mode is a mode in which FWD play and REV play are repeated many times until turn-on of the stop switch 45.

Figure 24:
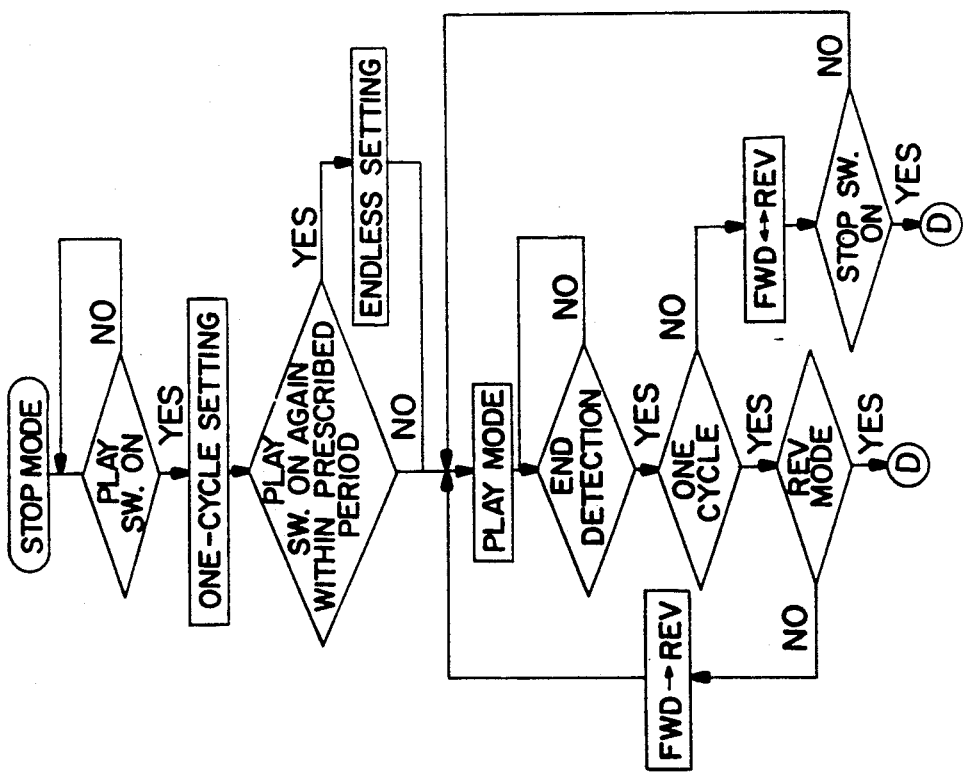
FIG. 24 is a flow chart for control of a one-cycle mode and an endless mode.

The one-cycle mode is automatically set when the play switch 42 is turned on by depressing the play button. More specifically, the control circuit 41 determines the turn-on of the play switch 42 and stores the setting of the play mode in the memory. At the same time, the control circuit 41 sets the one-cycle mode as shown in FIG. 24 and performs control operation to execute play in the one-cycle mode when the play switch 42 is not turned on again in a prescribed period after the above-mentioned turn-on of the play switch 42. If the play switch 42 is turned on again in the prescribed period, play in the endless mode described afterwards is executed.

The above-mentioned prescribed period is set to a suitable period within the time required from the first turn-on of the play switch 42 to turn-on of the play mode detection switch 42. Thus, when the play switch 42 is turned on after the play detection switch 47 is turned on, the control circuit 41 treats the present state as the FWD/REV switching signal.

Thus, when play in the one-cycle mode is set, either the FWD play mode or the REV play mode is applied as shown in FIG. 24. In this play mode, the control portion 41 repeats the determination as to whether the magnetic tape comes to a tape end or not by the signal from the rotation detector 50 and when it determines that the magnetic tape comes to the tape end, it determines whether the present mode is the one-cycle mode or not. Since the one-cycle mode is set in this case, the control circuit 40 subsequently determines whether the present play mode is the REV play mode or not. If it determines that the present mode is the REV play mode, it performs control to return the mode to the stop mode. If it determines that the present mode is not the REV play mode, it performs control to switch the respective components of the tape running mechanism to the REV play mode. Thus, the play in the one-cycle mode is stopped by detection of a tape end in REV play.

The stop control by the tape end detection in the REV play mode is performed in the following manner.

First, when a tape end is detected, the same control as in steps S11 to S14 in FIG. 22 is performed to switch the state of the tape running mechanism from the state in the REV play mode shown in FIGS. 7 and 15 to the state in the first stop mode shown in FIGS. 3 and 12. Then, the same control as in steps S2 to S9 in FIG. 20 is performed to temporarily switch the state of the tape running mechanism to the state in the FWD play mode shown in FIGS. 6 and 16. After that, the same control as in steps S11 to S15 in FIG. 22 is performed to change the state of the tape running mechanism to the state in the first stop mode shown in FIGS. 3 and 12, whereby the running is stopped.

The reason for switching the tape running mechanism to the stop mode after the temporary switching to the FWD play mode is that it is easy to use the tape player in that manner because the FWD play mode always starts when the player is used next time. More specifically stated, if the REV play mode is directly switched to the stop mode, the memory of the control circuit 41 stores the previous REV play mode and when the play button is depressed next to start play, the REV play mode would be started and a tape end would be detected immediately or in a short time to switch the mode to the stop mode. For the purpose of avoiding this inconvenience, the mode is temporarily switched to the FWD play mode and the FWD/REV detection switch 48 is operated so that the FWD play mode is stored as the previous mode in the memory of the control circuit 41, and then the mode is returned to the stop mode.

Endless mode:

After the play switch 42 is turned on by depressing the play button, when the play switch 42 is turned on again by depressing the play button within a prescribed period, the endless mode is set.

As shown in FIG. 24, each time the control circuit 41 detects a tape end by the signal from the rotation detector 50, the control circuit 41 performs control to switch the mode from the FWD play mode to the REV play mode, or from the REV play mode to the FWD play mode, so that FWD play and REV play are performed repeatedly. The above-described operation continues until the stop switch 45 is turned on by depression of the stop button. When the stop switch 45 is turned on, the control circuit 41 proceeds to step S15 from step S11 shown in FIG. 22 to stop the tape player in the first stop mode.

If the play switch 42 is turned on two or more times within a prescribed period after the first turn-on of the play switch 42, the second and subsequent turn-on may be rendered ineffective, or the one-cycle mode and the endless mode may be set alternately for each turn-on of the switch 42.

Operation by an initial switch:

In any of the operation modes such as the FWD play mode, REV play mode, FF mode or REW mode, when the ejection button is operated to take out the tape cassette, or when the headphone or earphone jack is detached, or when the battery source portion is removed, the initial switch 46 is turned on. Then, the control circuit 41 stores the turn-on of the initial switch 46 in the memory and reads out a corresponding control program from the memory and executes it.

Since the power supply is stopped when the battery portion is removed, it is not possible to execute immediately the above-mentioned control program and when the battery portion is attached next, the control program is executed.

Figure 25:
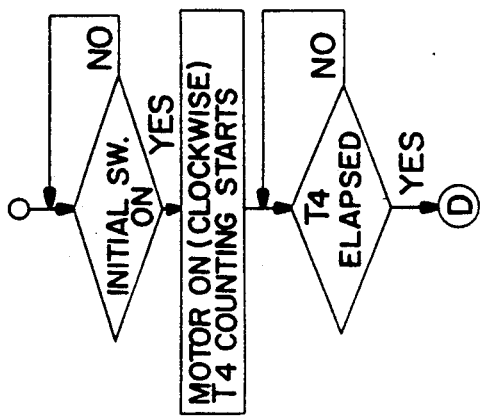
FIG. 25 is a flow chart by means of an initial switch.

When the control circuit 41 determines the turn-on of the initial switch 46, it starts counting for time T4 and rotates the motor 25 clockwise as shown in FIG. 25 and after elapse of the time T4, it performs control operation according to the flow chart in FIG. 22.

The above-mentioned time T4 is set longer than the time for mode switching which is the longest, so that suitable operation can be made if the initial switch 42 is turned on at any timing.

For example, if the initial switch 46 is turned on in a period from the turn-on of the play switch 42 to the switching to the FWD/REV selection position shown in FIGS. 5 and 14, the motor 25 rotates clockwise thereafter until the time T4 passes. After the elapse of the time T4, the mode has been switched to the REV play mode and accordingly control operation in steps S11 to S15 in FIG. 22 is performed, whereby the tape running mechanism is switched to the first stop mode, where it stops.

If the initial switch 46 is turned on in a period until the play mode detection switch 47 turns on after the tape running mechanism attains the FWD/REV selection position, the mode has been already determined to be the FWD play mode or the REV play mode and after the elapse of the time T4, the determined play mode is set. Thereafter, the mode switches to the first stop mode as in the above-mentioned case.

In addition, if the initial switch 46 is turned on during the operation in the FWD or REV play mode or the FF mode, the present mode is continued for the time T4 after the turn-on of the initial switch 46 and then the mode switches to the first or second stop mode to stop the operation.

Furthermore, if the initial switch 46 is turned on at any timing, the mode always switches to the stop mode to stop the operation.

If the initial switch 46 is turned on in the REW mode, the mode does not switch to the third stop mode of primary preference but it switches to the second stop mode. If the initial switch 46 is turned on in the REW mode shown in FIG. 2, the motor 25 rotates reversely in the clockwise direction and the slip gear 19 stops to rotate counterclockwise. As a result, the fast forwarding gear lever 17 rotates counterclockwise around the shaft 1a, so that the fast forwarding gear 18a is separated from the REV idler gear 13 and engages with the FWD idler gear 12. Thus, after the elapse of the time T4, the mode switches to the FF mode and then it switches from the FF mode to the stop mode and therefore the mode is the second stop mode.

Thus, the main operation of the tape player of the auto reverse type according to the embodiment has been described. In this tape player, the engagement between the play gear 16 and the FWD idler gear 12 or the REV idler coupling gear 14, and the engagement between the fast forwarding gear 18a and the FWD idler gear 12 or the REV idler gear 13 are not effected at the time of driving the PAD cam 24 and those engagements are effected at timing of stop of the PAD cam 24 to transmit the rotation force. Consequently, the load applied to the motor can be reduced.

In the above-described embodiment, if there is further provided means for generating an operation confirmation sound each time the switches are turned on, reliability of operation can be enhanced and operability can be improved.

In the above-described embodiment, the one-cycle mode is set by the first turn-on of the play switch and the endless mode is set by the subsequent turn-on of the play switch. However, the endless mode may be set at first and then the one-cycle mode may be set. Furthermore, a mode for playing only one side of the magnetic tape may be provided in addition to the one-cycle mode and the endless mode, so that those modes may be selected dependent on the number of turn-on operations of the play switch.

In addition, the above-mentioned time T1 may be set a little longer so that the fast forwarding gear lever 17 in the second stop mode shown in FIG. 1 can rotate clockwise around the shaft 1a to engage the fast forwarding gear 18a with the REV idler gear 13 and to rotate the feed gear 3 by a small amount in the rewinding direction. Thus, it is possible to avoid slackening of the tape which sometimes occurs at the time of switching not only from the third stop mode but also from the second stop mode to the play mode and the tape can be prevented from being wound around the pinch roller etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tape player of an auto reverse type having an endless mode for repeating forward play and reverse play, comprising:

means for determining whether a play button is reoperated within a prescribed period after said play button is first operated, and means for setting the endless mode or canceling the endless mode when said determining means detects that the play button is reoperated.

2. The tape player in accordance with claim 1, further comprising:

means for detecting a tape end of a tape, means for determining whether a present mode is a one-cycle mode or the endless mode in response to detection of the tape end by said tape end detecting means, means for determining whether a present play is the forward play or the reverse play in response to a determination that the present mode is the one-cycle mode, means for reversing a running direction of the tape in response to a determination that the present play is the forward play, means for stopping a tape driving motor in response to a determination that the present plate is the reverse play, and means for reversing the running direction of the tape in response to a determination that the present mode is the endless mode.

3. A tape player of an auto reverse type capable of selectively switching between a one-cycle mode where a tape driving motor is stopped after one cycle of forward play and reverse play, and an endless mode where said cycle of forward play and reverse play is repeated without stopping said motor, comprising:

a play button for starting forward play or reverse play, means for detecting operation of said play button and setting said one-cycle mode, means for determining whether said play button is reoperated within a prescribed period after said play button is first operated, and means for setting said endless mode in response to detection of reoperation of said play button by said determining means.

* * * * *